US012337451B2

(12) United States Patent
Yang et al.

(10) Patent No.: US 12,337,451 B2
(45) Date of Patent: Jun. 24, 2025

(54) ENERGY STORAGE AND DRIVING MECHANISMS AND NAIL GUN HAVING SAME

(71) Applicant: TAIZHOU DAJIANG IND. CO. LTD., Wenling (CN)

(72) Inventors: Tao Yang, Wenling (CN); Mingjun Yang, Wenling (CN); Zaijun Zhu, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 0 days.

(21) Appl. No.: 18/234,040

(22) Filed: Aug. 15, 2023

(65) Prior Publication Data

US 2024/0051104 A1 Feb. 15, 2024

(30) Foreign Application Priority Data

Aug. 15, 2022 (CN) .......................... 202222157232.0
Mar. 24, 2023 (CN) .......................... 202310320868.9
Mar. 24, 2023 (CN) .......................... 202320686686.9
May 12, 2023 (CN) .......................... 202310548274.3
May 12, 2023 (CN) .......................... 202321166257.5

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .................................. B25C 1/047; B25C 1/06
See application file for complete search history.

(56) References Cited

U.S. PATENT DOCUMENTS 3,722,625 A * 3/1973 Mathes .................. B25C 1/047 261/78.2
4,206,687 A * 6/1980 Klaus ...................... B22C 9/103 91/410
4,215,808 A * 8/1980 Sollberger ............. B25C 1/041 227/132

(Continued)

FOREIGN PATENT DOCUMENTS

CN 220313260 U * 1/2024
CN 117584082 A * 2/2024 ............. B25C 1/047

(Continued)

*Primary Examiner* — Lucas E. A. Palmer
(74) *Attorney, Agent, or Firm* — Troutman Pepper Locke LLP; Tim Tingkang Xia, Esq.

(57) ABSTRACT

The invention relates to an energy storage and driving mechanism and a nail gun having the same. The energy storage and driving mechanism includes a striking member, a driving member, and an energy storage member. Among them, the energy storage member includes a storage component, which is equipped with an inner cylinder and an outer cylinder. The outer cylinder and the inner cylinder are interconnected and form an air chamber. The striking member is movably disposed inside the inner cylinder, and has a low-energy storage position and a high-energy storage position. When the striking member is at the low-energy storage position, the volume of the air chamber is V1. When the striking member is at the high-energy storage position, the volume of the air chamber is V2. V1-V2 is approximately or equal to V2/3.

17 Claims, 17 Drawing Sheets

(56) References Cited

U.S. PATENT DOCUMENTS

| | | | | | |
|---|---|---|---|---|---|
| 4,253,598 | A * | 3/1981 | Haytayan | B25C 1/047 227/119 |
| 4,294,391 | A * | 10/1981 | Obergfell | B25C 1/003 91/399 |
| 4,319,705 | A * | 3/1982 | Geist | B25C 1/044 91/461 |
| 4,384,623 | A * | 5/1983 | Galloni | B25C 1/041 173/127 |
| 4,509,669 | A * | 4/1985 | Elliesen | B25C 1/047 91/243 |
| 8,011,547 | B2 * | 9/2011 | Leimbach | B25C 1/041 227/129 |
| 10,632,600 | B2 * | 4/2020 | Pomeroy | B25C 1/06 |
| 12,083,659 | B2 * | 9/2024 | Bierdeman | B25C 1/047 |
| 2006/0180631 | A1 * | 8/2006 | Pedicini | B25C 1/06 227/8 |
| 2008/0078799 | A1 * | 4/2008 | Wen | B25C 1/047 227/131 |
| 2010/0213235 | A1 * | 8/2010 | Pedicini | B25C 1/047 227/130 |
| 2011/0198381 | A1 * | 8/2011 | McCardle | B25C 1/06 227/8 |
| 2011/0266327 | A1 * | 11/2011 | Wu | B25C 1/047 227/8 |
| 2018/0290279 | A1 * | 10/2018 | Kobori | B25C 1/047 |
| 2019/0202042 | A1 * | 7/2019 | Wu | B25C 1/047 |
| 2019/0224825 | A1 * | 7/2019 | Pedicini | B25C 1/06 |
| 2019/0375084 | A1 * | 12/2019 | Bierdeman | B25C 1/047 |
| 2020/0055177 | A1 * | 2/2020 | Scott | B25F 5/02 |
| 2020/0282534 | A1 * | 9/2020 | Po | B25C 1/06 |
| 2020/0391364 | A1 * | 12/2020 | Yasutomi | B25C 1/047 |
| 2020/0391365 | A1 * | 12/2020 | Tanaka | B25C 1/043 |
| 2021/0138623 | A1 * | 5/2021 | Bierdeman | B25C 1/06 |
| 2021/0237242 | A1 * | 8/2021 | Carrier | B25C 1/047 |
| 2021/0245344 | A1 * | 8/2021 | Liu | F16F 15/08 |
| 2021/0291335 | A1 * | 9/2021 | Liu | B25C 1/047 |
| 2024/0051106 | A1 * | 2/2024 | Yang | B25C 5/1627 |

FOREIGN PATENT DOCUMENTS

| | | | | |
|---|---|---|---|---|
| CN | 118682705 | A * | 9/2024 | B25C 1/047 |
| EP | 2851157 | A1 * | 3/2015 | B25C 1/04 |

* cited by examiner

ENERGY STORAGE AND DRIVING MECHANISMS AND NAIL GUN HAVING SAME

CROSS-REFERENCE TO RELATED PATENT APPLICATIONS

This application claims priority to and benefit of Chinese Patent Application No. 202222157232.0 filed on Aug. 15, 2022, Chinese Patent Application No. 202210977299.0 filed on Aug. 15, 2022, Chinese Patent Application No. 202310320868.9 filed on Mar. 24, 2023, Chinese Patent Application No. 202320686686.9 filed on Mar. 24, 2023, Chinese Patent Application No. 202310548274.3 filed on May 12, 2023, and Chinese Patent Application No. 202321166257.5 filed on May 12, 2023, which are hereby incorporated by reference in their entireties.

FIELD OF THE INVENTION

This invention relates generally to fastening tools technology, and more particularly to energy storage and driving mechanisms for a nail gun.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nail gun is a fastening tool commonly used in construction. Based on different power sources, nail guns are grouped into lithium-ion battery nail guns and pneumatic nail guns. Among them, a lithium-ion battery nail gun utilizes energy from lithium batteries. The control system drives the motor and corresponding transmission mechanism to push the piston, compressing a pitch spring for energy storage. During nailing, the pitch spring drives the piston's movement, which in turn drives the striking pin installed on the piston to impact and shoot out the nail, achieving the nailing process.

On the other hand, a pneumatic nail gun incorporates an internal cylinder within the gun casing. Inside the cylinder, a piston divides the cylinder's inner chamber into intake and exhaust compartments. The intake compartment requires a separate air compressor for air supply. By introducing high-pressure air from the air compressor into the intake compartment, the piston is propelled, driving the striking pin attached to the piston to impact and shoot out the nail, achieving the nailing process.

The above-mentioned nail guns that use springs for energy storage and to drive the nailing process have limitations due to the inherent characteristics of spring force. Therefore, they are less suitable for nailing objects with greater hardness. On the other hand, the pneumatic nail guns mentioned above require a separate air compressor to provide air, which is not convenient to carry during actual usage.

In addition, the aforementioned transmission structure includes a drive mechanism, which comprises a drive wheel and a strike member which meshes with this drive wheel. The drive wheel is equipped with pinions, and the striking member is designed with a teeth structure that engages with the pinions. The drive motor drives the rotation of the drive wheel, which then causes the striking member to rise and store energy. When the drive wheel rotates past the position of the last pinion, the striking member is released to strike a nail. At this moment of release, the teeth structure causes wear on the last pinion. After prolonged use (as per experimental tests, after 10,000 strikes), this last pinion can easily break, posing a safety risk. Moreover, this wear reduces the service life of the nail gun.

Therefore, a heretofore unaddressed need exists in the art to address the aforementioned deficiencies and inadequacies.

SUMMARY OF THE INVENTION

In one aspect, this invention relates to an energy storage and driving mechanism used for a nail gun. The energy storage and driving mechanism comprises a striking member for striking a nail stored inside the lithium battery nail gun in a striking direction; a driving member driving the striking member to move in a direction opposite to the striking direction; and an energy storage member providing energy to the striking member and storing energy when the striking member is driven by the driving member; wherein the energy storage member comprises a storage component comprising an inner cylinder, an outer cylinder interconnected to the inner cylinder, and an air chamber formed between the inner cylinder and the outer cylinder; wherein the striking member is partially and movably disposed inside the inner cylinder; wherein the striking member is movable between a low-energy storage position and a high-energy storage position.

In one embodiment, when the striking component is at the low-energy storage position, the air chamber has a volume of V1; wherein when the striking member is at the high-energy storage position, the air chamber has a volume of V2; and wherein V1-V2 is approximately or equal to V2/3.

In one embodiment, the V1 is about 920 ml, and the V2 is about 690 ml.

In one embodiment, the driving component comprises a power source; a speed reducer connected to the power source; and a transmission component connected to the speed reducer and the striking member to drive the striking member.

In one embodiment, the transmission component comprises a limiting disk for being driven by the speed reducer to rotate; and a rotating part in connection with the limiting disk, wherein the rotating part comprises more than one pinions respectively received by more than one grooves formed on the striking member.

In one embodiment, the speed reducer comprises a first reducer and a second reducer, and the speed reducer has a transmission ratio about 1:120.

In one embodiment, the outer cylinder comprises an outer cylinder body; and a back cover detachably disposed at a rear end of the outer cylinder body; and a first seal disposed between the back cover and the outer cylinder body.

In one embodiment, the outer cylinder body comprises an inlet; an inlet passage connecting the inlet to the air chamber; and an inflation component in connection with the inlet.

In one embodiment, the outer cylinder body comprises a pressure relief port on a front end of the outer cylinder body; a pressure relief component connected to the pressure relief port; and a pressure relief passage connected to the pressure relief port and the air chamber.

In one embodiment, the inflation component is configured to inflate the air chamber; and the pressure relief component is configured to release pressure in the air chamber.

In one embodiment, the pressure relief component comprises an automatic pressure relief valve which is configured to open automatically when the pressure of the air chamber exceeds a predetermined pressure.

In one embodiment, the automatic pressure relief valve comprises a pressure relief valve body having a pressure relief chamber and a pressure relief hole; a pressure relief valve core movably disposed in the pressure relief chamber; and a pressure relief spring disposed inside the pressure relief chamber and providing a force to the pressure relief valve core.

In one embodiment, the energy storage and driving mechanism 1 further comprising a buffer pad disposed at an inner side of a front end of the inner cylinder and is configured for buffering the striking member.

In one embodiment, the buffer pad comprises a through hole which is configured to permit a front end of the striking component to pass through; and an installation protruding ring which is configured to abut against a surface of the front end of the inner cylinder.

In one embodiment, the inner cylinder comprises a first chamber and a second chamber; volume of each of the first and the second chamber is variable.

In one embodiment, the first chamber fluidly communicates with the outside, the second chamber fluidly communicates with the air chamber; and wherein the front end of the inner cylinder comprises an inner through hole connecting the first chamber to the outside.

In one embodiment, the outer cylinder comprises an installation snap ring disposed on an inner wall of the outer cylinder for abutting against the front end of the inner cylinder; an outer through hole connected to the inner through hole; and a limit surface for limiting the movement of the buffer pad.

In one embodiment, the inner cylinder comprises a third seal on its outer periphery, forming a sealed state between the inner cylinder and the outer cylinder; wherein the outer through hole and the air chamber are respectively located on two sides of the third seal.

In one embodiment, a positioning ring is disposed between the inner cylinder and the outer cylinder for supporting the inner cylinder; wherein the positioning ring comprises an air passage for air to pass through; wherein the front end of the inner cylinder is connected to the outer cylinder, the rear end of the inner cylinder is connected to the outer cylinder through the positioning ring.

In one embodiment, a convex ring matching the positioning ring is disposed on an outer circumference of the inner cylinder, and the positioning ring is limited between the back cover and the convex ring.

In another aspect of the invention, a nail gun for nailing. The nail gun comprises an energy storage and driving mechanism as disclosed above; a nail pass-through mechanism allowing the nails to pass through; and a power source providing energy for the energy storage and driving mechanism. The power source comprises a battery, for example, a lithium-ion battery, or a rechargeable lithium-ion battery.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
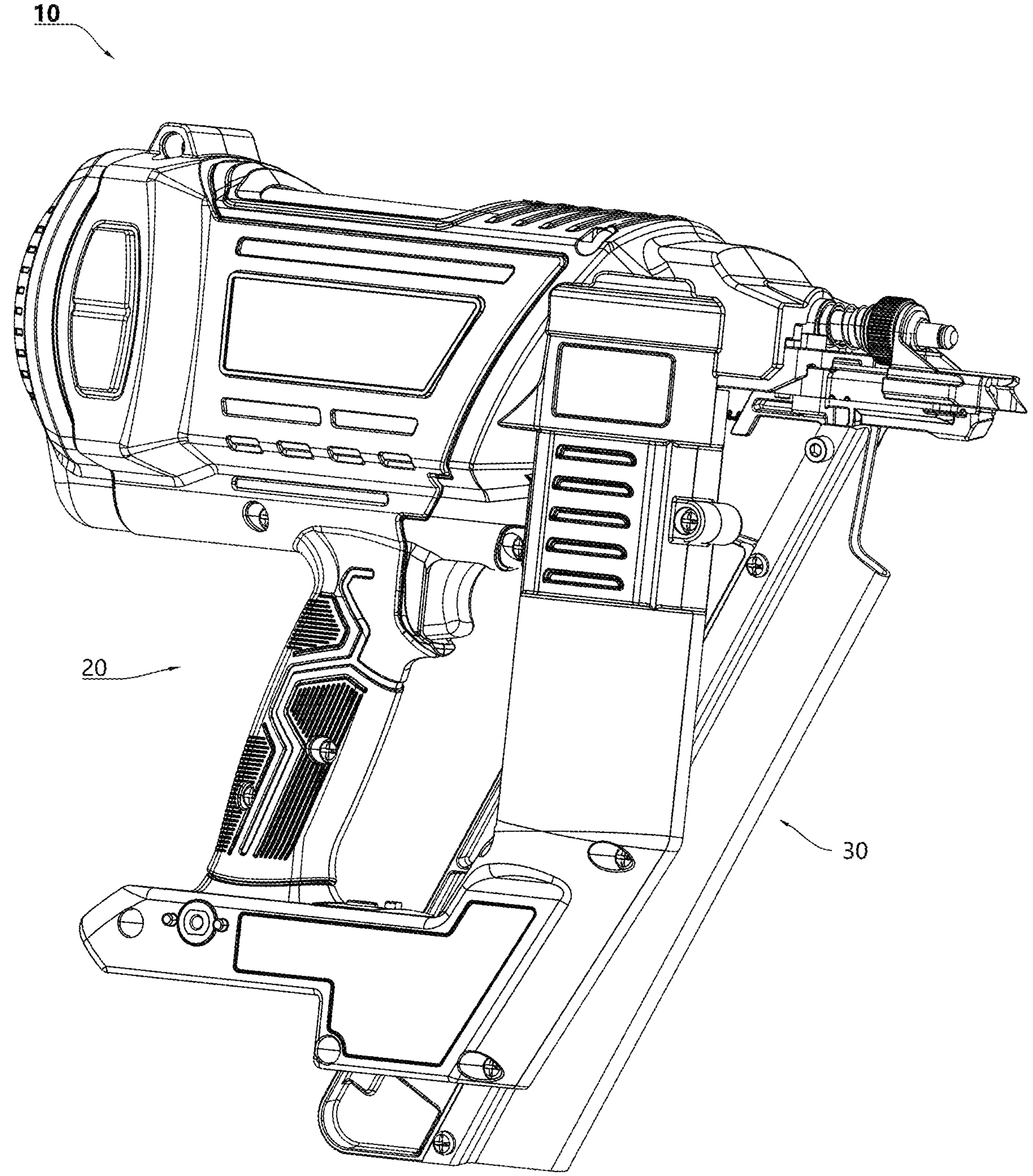
FIG. 1 is a schematic structural view of a nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

As used in the disclosure, "energy storage" refers to a function of a device for storing the energy within the device. The energy may be in form of pressure, heat, or other forms.

As used in the disclosure, "air chamber" refers to an internal chamber, cavity, or compartment within a device into which a volume of fluid is enclosed. The fluid may be air, gas, nitrogen or other form of fluid proper for providing pressure in the chamber. The air chamber has one or more port for receiving and/or releasing fluid. The air chamber may be air-tight when all the ports are closed.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to energy storage and driving mechanism used for a nail gun. Embodiments of the invention are now described in conjunction with the accompanying drawings in FIGS. 1-28.

Embodiment 1

This invention provides an energy storage and driving mechanism used for a nail gun, which has a large air chamber volume, can store air, and does not need an air compressor to provide air in real time. It is more convenient and safer. The technical solution adopted by the invention is as follows.

The invention provides an energy storage and driving mechanism for a nail gun, which is disposed inside the nail gun and used to drive the firing of the nail. The energy storage and driving mechanism includes: a striking member having a striking direction and used to drive the nail in the lithium-ion battery nail gun in the striking direction; a driving member used in conjunction with the striking member to drive the striking member in the opposite direction of the striking direction; and an energy storage member, used in conjunction with the striking member to accumulate energy when the striking member is driven by the driving member. The energy storage member includes: a storage component, equipped with an inner cylinder and an outer cylinder, the outer cylinder communicates with the inner cylinder to form an air chamber; the striking member is set in the inner cylinder and has a low and high energy storage position. When the striking member is at the low energy storage position, the volume of the air chamber is V1, and when the striking member is at the high energy storage position, the volume of the air chamber is V2, V1-V2 is approximately or equal to V2/3.

In one embodiment, V1 is about 920 ml, V2 is about 690 ml.

In one embodiment, the driving member includes a drive source used to provide power; a speed reducer installed at the output end of the drive source; and a transmission component installed at the output end of the speed reducer and used in conjunction with the striking member to drive the striking member. The transmission part includes a rotating part used for rotation driven by the reducer; a matching part disposed on the rotating part, used to match the striking pin and contains several pin and groove combinations on the striking pin. The transmission ratio of the reducer is 1:120, and includes the first, second and third reducer connected in series.

In one embodiment, the outer cylinder includes an outer cylinder body, in which an inner cylinder body is installed; a rear cover body which can be disassembled and installed at the rear end of the outer cylinder body; and a first sealing part used to form a sealed state between the rear cover body and the outer cylinder body. The rear end of the outer cylinder body has an air inlet for installing an inflation part. The outer cylinder body has an air inlet channel connected to the air chamber. The front end of the outer cylinder body has a pressure relief port for installing a pressure relief component. The outer cylinder has a pressure relief channel between the pressure relief port and the air chamber.

In one embodiment, the energy storage member also includes: an inflation part installed on the storage component and used to inflate the air chamber, a pressure relief component installed on the storage component and used to relieve pressure in the air chamber. The pressure relief component is an automatic pressure relief valve, used to automatically open and relieve pressure when the internal pressure of the air chamber exceeds a predetermined pressure. The automatic pressure relief valve includes: a pressure relief valve body installed in the pressure relief port and has a pressure relief cavity and a pressure relief hole connected to the outside environment; a pressure relief valve core disposed in the pressure relief cavity and used to connect and separate the pressure relief hole and the pressure relief port;

and a pressure relief spring installed in the pressure relief cavity and used to provide force for the pressure relief valve core.

In one embodiment, a buffer pad is fixed at the front end of the inner side of the inner cylinder and used to buffer the striking mechanism. The buffer pad includes a through hole used for the front end of the striking mechanism to pass through, an installation protruding ring, used to abut the front end of the inner cylinder. The inner cylinder has a first and second chamber with variable volume, the first chamber communicates with the outside environment, the second chamber communicates with the air chamber. The inner cylinder has an inner through hole at the end near the buffer pad, which communicates the first chamber with the outside environment.

In one embodiment, the outer cylinder includes an installation snap ring, formed on the inner wall of the outer cylinder and used to abut the front end of the inner cylinder; an outer hole, communicating with the inner through hole; and a limit surface, used to limit the movement of the buffer pad. The periphery of the inner cylinder is equipped with a third sealing part used to form a sealed state between the inner cylinder and the outer cylinder, the outer hole and the air chamber are respectively on both sides of the third sealing part.

In one embodiment, there is a positioning ring between the inner cylinder and the outer cylinder body, used to support the inner cylinder. The positioning ring has a ventilation hole for air to pass through. The front end of the inner cylinder is fixed with the outer cylinder body, the rear end of the inner cylinder is fixed with the outer cylinder body through the positioning ring. The outer periphery of the inner cylinder has a protruding ring that matches the positioning ring, and the positioning ring is limited between the rear cover body and the protruding ring.

The invention also discloses a nail gun for nailing, which includes at least: an energy storage and driving mechanism, used in conjunction with the nails and drives the nails to move in the striking direction, a nail passing mechanism, used to let the nails pass through, a power source, used to provide energy for the energy storage and driving mechanism, where the energy storage and driving mechanism is the aforementioned energy storage and driving mechanism, and the power source comprises a battery, for example, a lithium-ion battery, or a rechargeable lithium-ion battery.

As disclosed in the invention of the energy storage mechanism and the nail gun, because the energy storage member is equipped with an air chamber for accommodating and storing air, make the energy storage member of the nail gun itself has an air storage function. There is no need to connect to a compressor to provide air during the operation of the nail gun, which simplifies the structure and makes it more convenient to carry and use. In addition, when the striking member is at a low energy storage position, the volume of the air chamber is V1, and when the striking member is at a high energy storage position, the volume of the air chamber is V2. The difference in the volume of the air chamber at high energy storage and low energy storage, V1-V2, is approximately or equal to V2/3. This difference is essentially the volume of the area where the striking member moves inside the cylinder body from a low energy storage position to a high energy storage position. This volume occupies a large proportion of the entire energy storage member, which, by increasing the volume of the inner cylinder, reduces the energy consumption of the entire gun body during operation. Thus, this design reduces the requirements for the motor and battery consumption of the lithium battery nail gun, miniaturing and lightening of the lithium battery nail gun, and therefore reduce the costs.

This embodiment provides a nail gun with an energy storage component for the nail gun, which is more convenient to operate and can enhance safety and nail shooting effects.

FIG. 1 shows a structural diagram of a nail gun in one embodiment of the invention.

Figure 2:
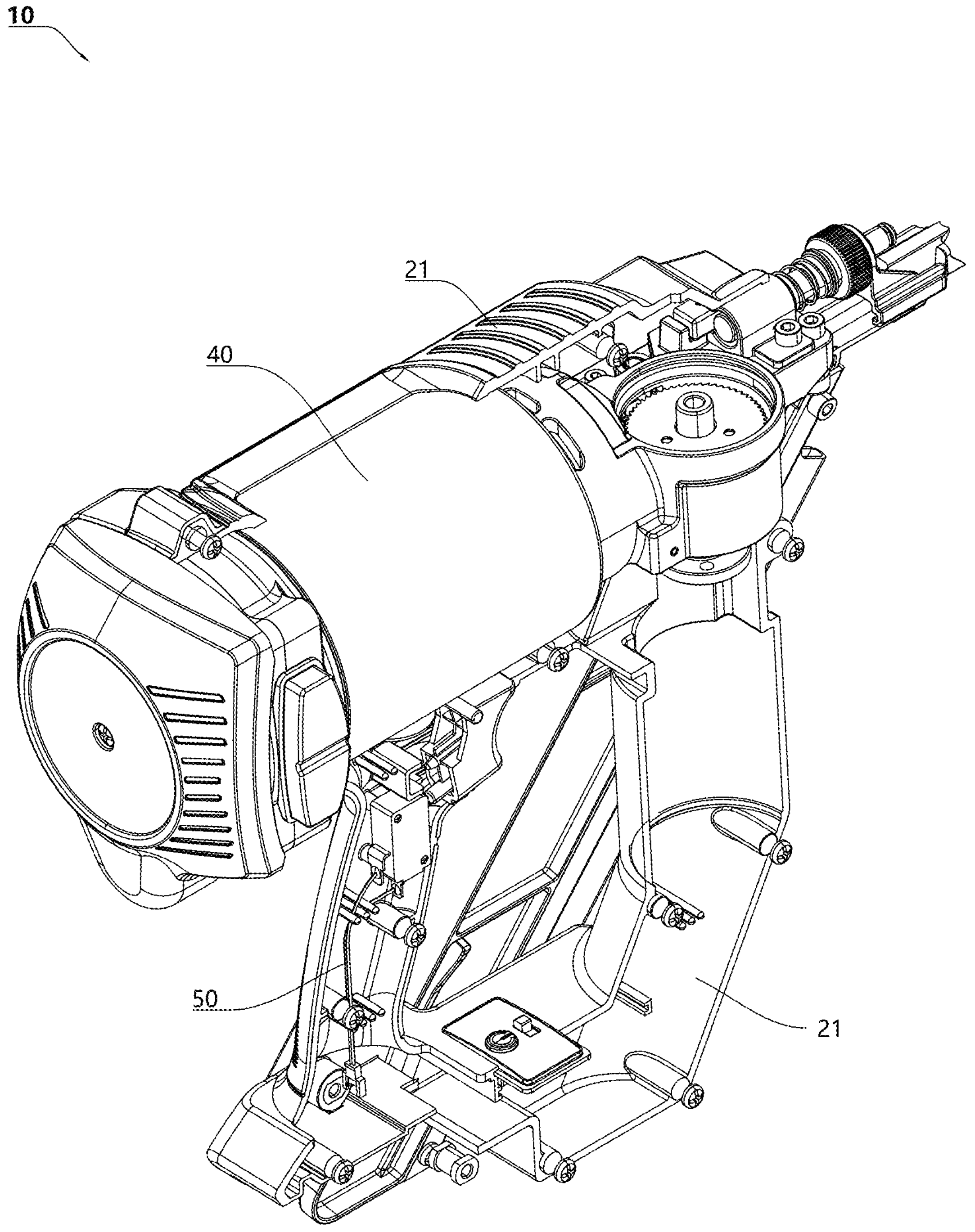
FIG. 2 is a schematic structural view of a lithium-ion battery nail gun with partial casing removed according to one embodiment of the invention.

FIG. 2 shows a structural diagram of the nail gun with partial shell removed in one embodiment of the invention.

The nail gun 10 according to one embodiment of the invention includes a containment mechanism 20, a nail storage mechanism 30, a driving mechanism 40 for driving the nail out, and a control mechanism 50 for controlling the driving member. As shown in FIGS. 1 and 2, the containment mechanism 20 includes a casing 21 set on the outside, the nail storage mechanism 30 is set at the front end of the casing 21, and nails are stored inside the nail storage mechanism 30. The control mechanism 50 includes parts such as a power source (lithium battery), control board, circuit, switch, etc. (not fully shown in the figures), all installed inside and on the surface of the casing 21. The casing 21 not only contain internal parts such as the driving mechanism 40 and the control mechanism 50, but also protect these internal parts.

Figure 3:
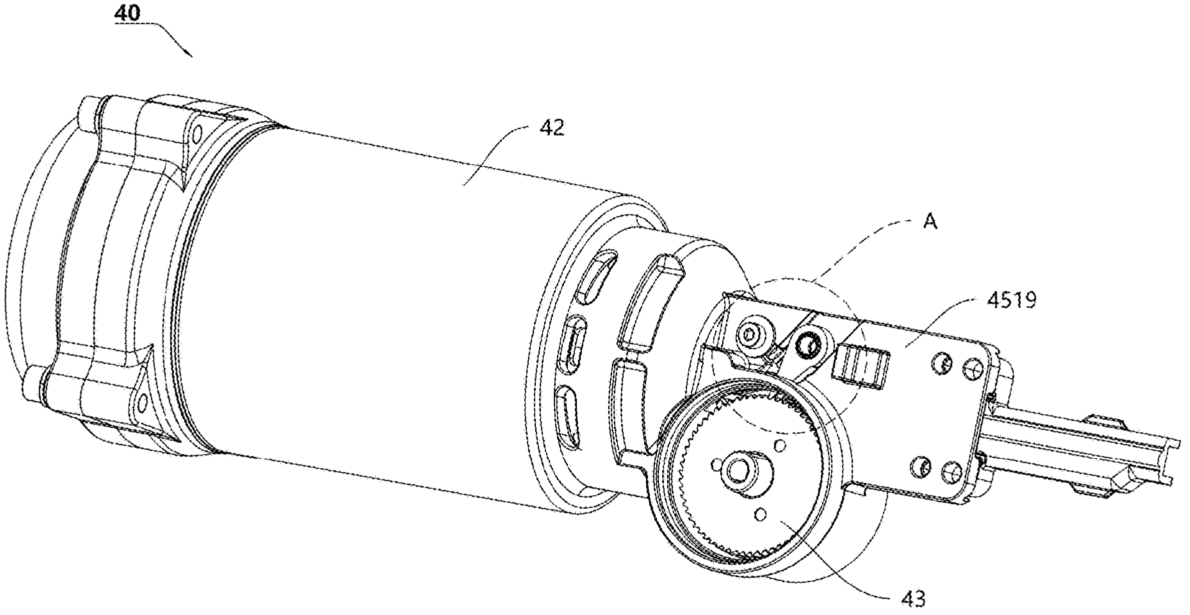
FIG. 3 is a schematic structural view of an energy storage and driving mechanism of the lithium-ion battery nail gun according to one embodiment of the invention.

FIG. 3 shows a structural diagram of the driving member according to one embodiment of the invention.

Figure 4:
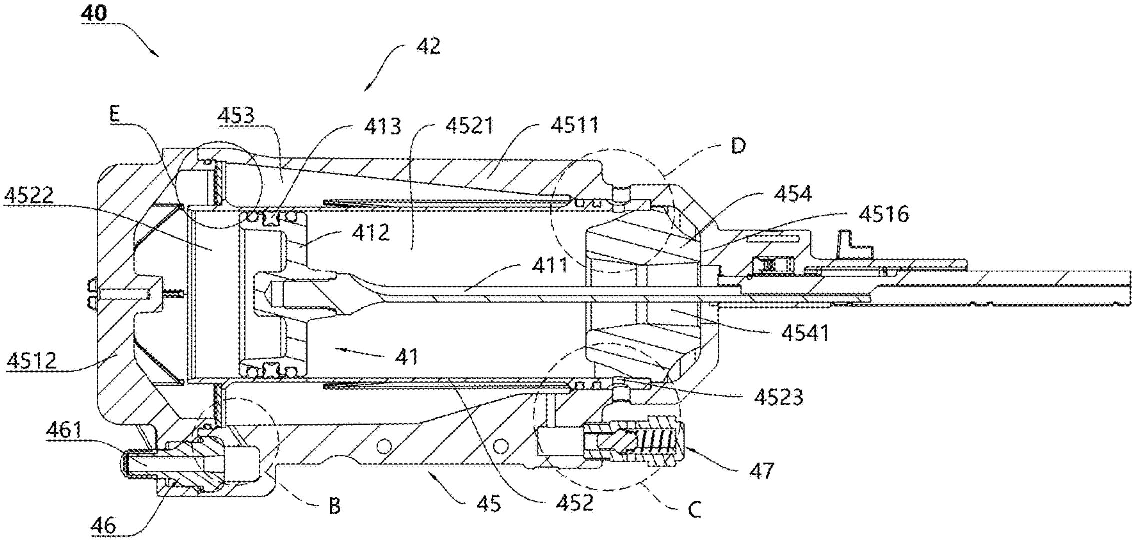
FIG. 4 shows schematically a partially cross-sectional view of the energy storage and driving mechanism according to one embodiment of the invention.

FIG. 4 is a cross-sectional view of the driving member according to one embodiment of the invention.

The driving mechanism 40 is set inside the casing 21 and is used to act on the nail to drive the nail out. As shown in FIGS. 3-4, the driving mechanism 40 includes an energy storage driving member that comes into direct contact with the nail and is used to drive the nail out. The energy storage driving member has a striking member 41, an energy storage component 42 for providing power to the striking member 41, and a driving member 43. The striking member 41 has a hitting direction for driving out the nail. The energy storage component 42 can drive the striking member 41 to move forward along the hitting direction to drive the nail out, while the driving member 43 drives the striking member 41 to move backwards along the hitting direction, thereby triggering the energy storage component 42 to store power.

The striking member 41 has a striking pin part 411 and a piston part 412. The inner end of the striking pin part 411 is inserted on the piston part 412. The piston part 412 is movably disposed inside the energy storage member 42. The outer end of the striking pin part 411 extends out of the energy storage component 42 to push the nail and drive the nail out along the hitting direction.

Figure 5:
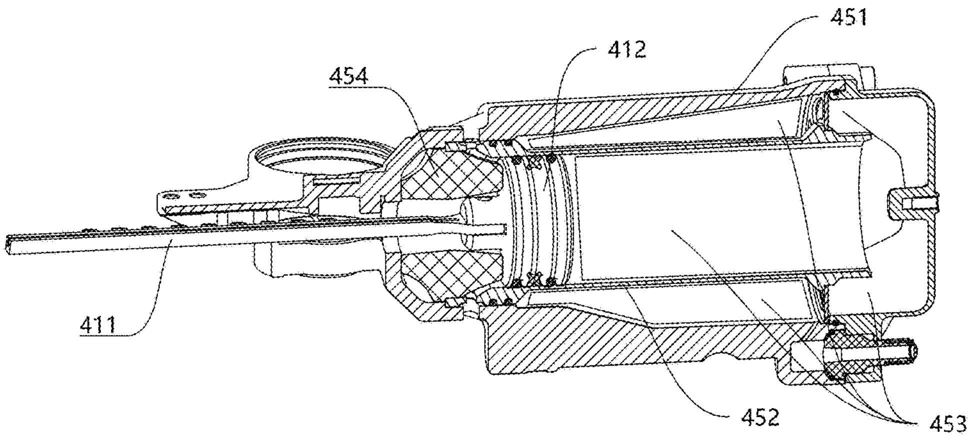
FIG. 5 is a cross-sectional view of the energy storage and driving mechanism when the striking member is at a low energy storage position according to one embodiment of the invention.

FIG. 5 is a cross-sectional view of the driving member when the striking member is at a low energy storage position according to one embodiment of the invention.

Figure 6:
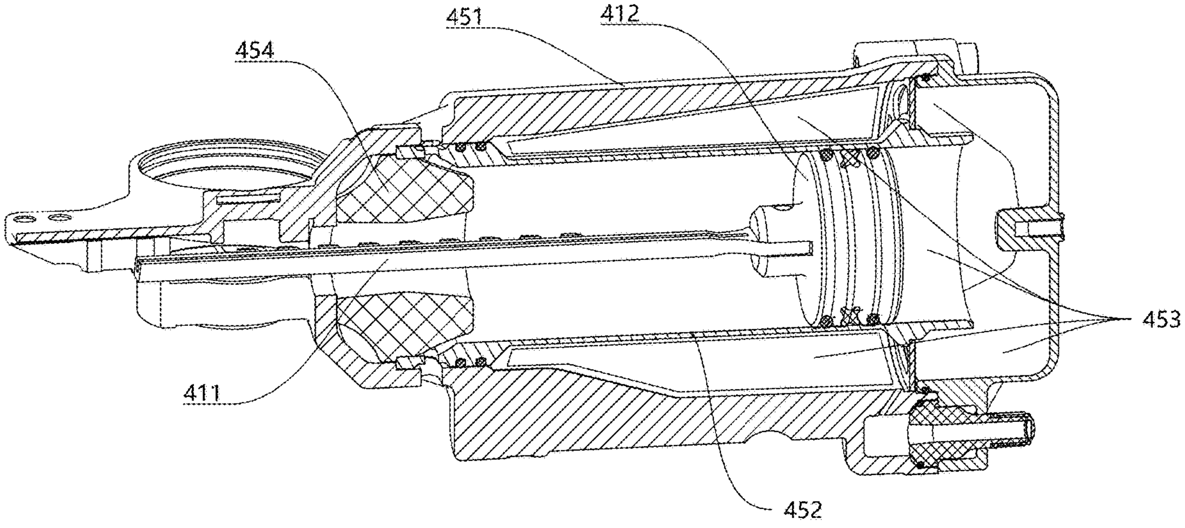
FIG. 6 is a cross-sectional view of the energy storage and driving mechanism when the striking member is at a high energy storage position according to one embodiment of the invention.

FIG. 6 is a cross-sectional view of the driving member when the striking member is at a high energy storage position according to one embodiment of the invention.

Figure 7:
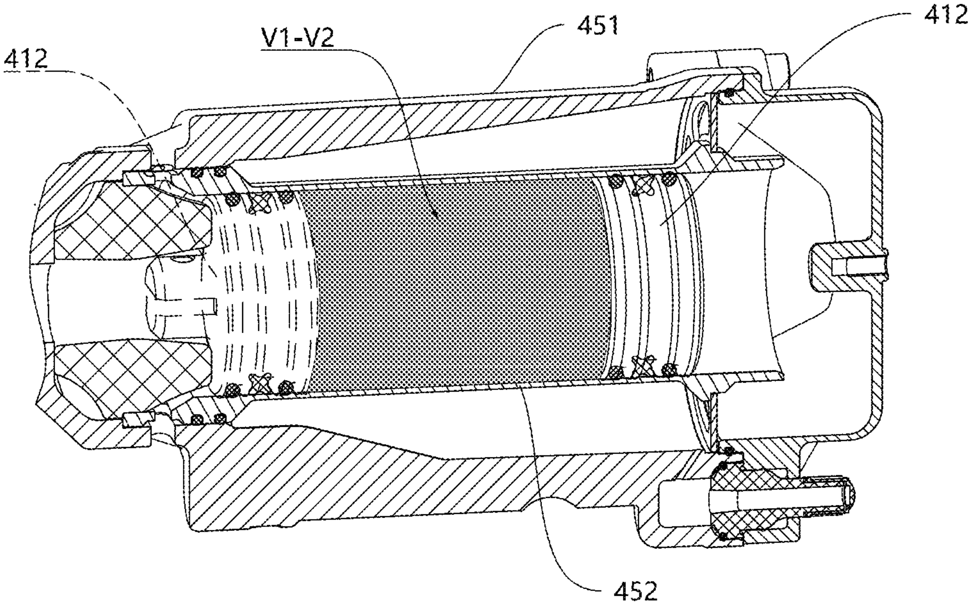
FIG. 7 is a cross-sectional view of the energy storage member according to one embodiment of the invention.

FIG. 7 is a cross-sectional view of the storage component according to one embodiment of the invention.

As shown in FIG. 4, the energy storage component 42 includes a storage component 45, an inflation component 46, and a pressure relief component 47. The storage component 45 has an outer cylinder 451 and an inner cylinder 452. The outer cylinder 451 includes an outer cylinder body 4511 and a rear cover body 4512 covering the rear end of the outer cylinder body 4511. The rear cover body 4512 can be disassembled and set. The inside of the outer cylinder body 4511 is hollowly set. The inside of the outer cylinder body 4511 is also installed with the inner cylinder 452. An air chamber 453 is formed between the inner cylinder 452 and the outer cylinder 451. The inner cylinder 452 has a long tubular structure. The inside of the inner cylinder 452 is installed with a striking member 41. The outer circumference of the piston part 412 of the striking member 41 is close to the inner wall of the inner cylinder 452. A second seal is pressed between the piston part 412 and the inner wall of the inner cylinder 452. In one embodiment, the second seal comprises a sealing ring 413. The piston part 412 has a striking pin part 411. The front end of the striking pin part 411 extends out of the front end of the inner cylinder 452 and the outer cylinder body 4511, and is used in cooperation with the transmission component.

The striking member 41 is movably disposed within the inner cylinder 452 via the piston part 412, and it has a low energy storage position and a high energy storage position. As shown in FIG. 5, the striking member 41 is at the low energy storage position, and the volume of the air chamber 453 is V1. As shown in FIG. 6, the striking member 41 is at the high energy storage position, and the volume of the air chamber 453 is V2. The air chamber 453 includes the volume of the inner cylinder 452, the volume between the outer cylinder 451 and the inner cylinder, i.e., the space region formed between the piston part 412 of the striking member 41 and the outer cylinder 451. The low energy storage position is when the striking member 41 is located at the front end of the inner cylinder 452 and the striking member is not driven by the driving member 43; the high energy storage position is when the striking member 41 is located at the rear end of the inner cylinder 452, and the striking member 41 is driven by the driving member 41 to the limit position. The difference between V1 and V2 is actually the volume of the part of the inner cylinder 452 swept by the piston part 412 when the striking member moves from the low energy storage position to the high energy storage position (as shown in the gray area in FIG. 7. In FIG. 7, the dotted line part is the position of the piston part 412 at the low energy storage position, and the solid line part is the position of the piston part 412 at the high energy storage position).

The volume of V1-V2 depends on the size of the inner cylinder 452 and the distance moved by the piston part 412 driven by the driving member. In one embodiment, V1-V2 is approximately or equal to ⅓ V2. The volume of the inner cylinder 452 accounts for a large proportion, which makes the energy consumption small and requires less consumption of the motor and battery. In one embodiment, V1 is about 920 ml, and V2 is about 690 ml. The inventor has conducted multiple experiments under the same temperature and environment during the research and development process, as follows:

(1) When the striking member 41 is at a low energy storage position,

When the air pressure rushes into 0.5 MPa, the pressure is 1100N, and the kinetic energy is about 65 J;

When the air pressure rushes into 0.6 MPa, the pressure is 1350N, and the kinetic energy is about 80 J;

When the air pressure rushes into 0.7 MPa, the pressure is 1560N, and the kinetic energy is about 95 J;

(2) When the striking member 41 is at a high energy storage position,

When the air pressure rushes into 0.5 MPa, the pressure is 900N; the kinetic energy is about 50 J;

When the air pressure rushes into 0.6 MPa, the pressure is 1050N; the kinetic energy is about 60 J;

When the air pressure rushes into 0.7 MPa, the pressure is 1200N; the kinetic energy is about 72 J;

As shown in FIG. 4, the piston part 412 and the sealing ring 413 divide the inside of the inner cylinder 452 into two separate parts, respectively the first chamber 4521 and the second chamber 4522, and the volumes of these two parts will change during the movement of the piston part 412. The second chamber 4522 is connected with the air chamber 453, and the first chamber 4521 is separated from the second chamber 4522 and connected with the outside environment. The front end of the inner cylinder 452 is provided with an inner through hole 4523 that communicates the first chamber 4521 with the outside environment. In one embodiment, the back cover 4512 is designed to be removable, which is convenient for disassembling the outer cylinder to replace or repair the internal striking member 41. In order to form a sealed space inside the air chamber, a first sealing part 4513 is provided at the connection between the back cover 4512 and the outer cylinder body 4511 to enhance the tightness of the connection between the back cover 4512 and the outer cylinder body 4511 and avoid situations such as air leakage from the air chamber 453. In one embodiment, the first sealing part 4513 uses a sealing ring (as shown in FIG. 8).

The air chamber 453 is filled with air or nitrogen. Since the striking member 41 is installed inside the inner cylinder 452, when the striking pin part 411 is driven by the transmission component 431 to move, the piston part 412 will move towards the direction of the second chamber 4522, and the volume of the second chamber 4522 gradually decreases, thus the air/nitrogen in the air chamber 453 is compressed, causing the internal pressure of the air chamber 453 to gradually increase and energy to be accumulated. And the largest volume of the first chamber 4521 is V1-V2.

Figure 8:
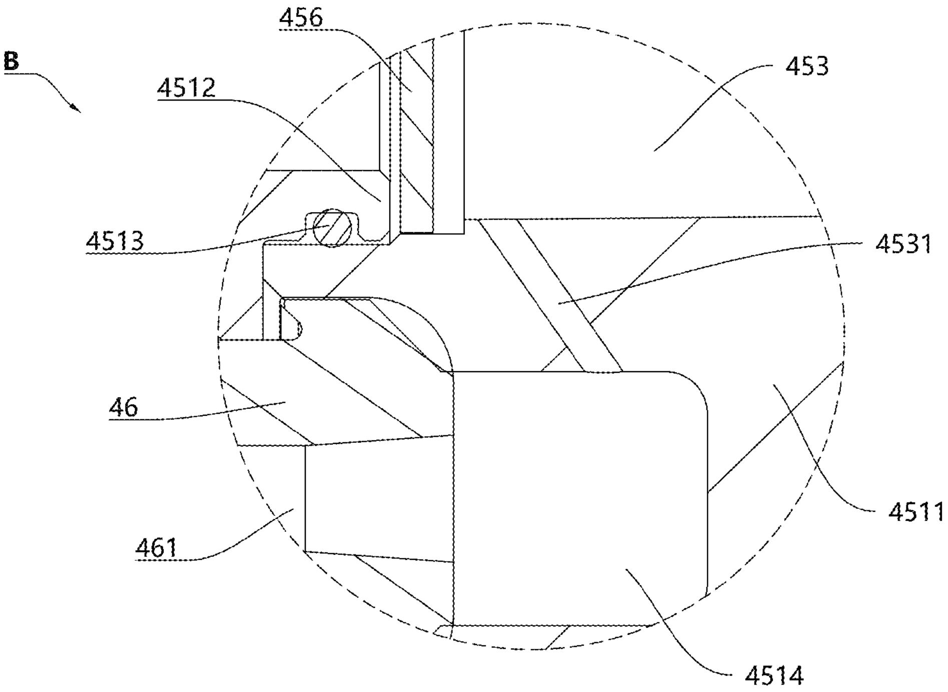
FIG. 8 is an enlarged view of part B in FIG. 4.

FIG. 8 is a partial magnification of part B in FIG. 4.

In order to conveniently supplement the air in the air chamber 453, an inflation component 46 is provided at one end of the outer cylinder body 4511 near the rear cover 4512. As shown in FIGS. 4 and 8, an air inlet 4514 is provided at the position of the outer cylinder body 4511 close to the rear cover 4512, and an air intake passage 4531 that communicates the air chamber 453 and the air inlet 4514 is provided on the side of the outer cylinder body 4511 at the air inlet 4514. The inflation component 46 is an inflating nozzle with an inflation channel 461 in the middle. The inner end of the inflation nozzle is inserted at the air inlet 4514, and the outer end extends out of the outer cylinder body 4511 and is exposed to the outside, making it convenient for users to inflate the inflating nozzle.

Figure 9:
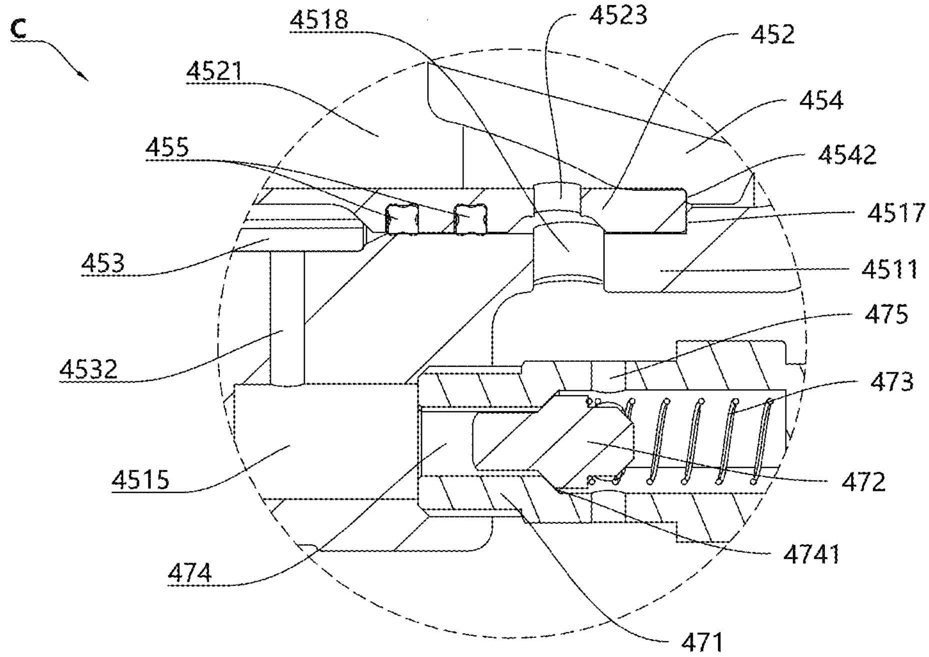
FIG. 9 is an enlarged view of part C in FIG. 4.

FIG. 9 is a partial magnification of part C in FIG. 4.

A pressure relief component 47 is provided on one side of the front end of the outer cylinder body 4511. In one embodiment, the pressure relief component 47 is an automatic pressure relief valve. When the air pressure in the air chamber 453 gradually increases and reaches a predetermined value, the automatic pressure relief valve will automatically open to relieve the pressure in the air chamber 453, so that the air pressure in the air chamber 453 always remains below the predetermined value, ensuring the safety of the interior of the outer cylinder body 4511. In addition, the outer end of the pressure relief component 47 is exposed on the outside of the outer cylinder body 4511. When the user needs to disassemble and check the outer cylinder 451, the pressure relief valve can be opened manually first, to release the air inside the air chamber 453 before disassembly, avoiding the high internal pressure of the air chamber

453 from causing the striking member 41 to be accidentally triggered and harm the user, enhancing the safety of the product.

Specifically, as shown in FIG. 9, a pressure relief port 4515 is provided on one side of the front end of the outer cylinder body 4511, and a pressure relief passage 4532 communicating this pressure relief port 4515 with the air chamber 453 is provided on the outer cylinder body 4511. The automatic pressure relief valve has a pressure relief valve body 471, a pressure relief valve core 472, and a pressure relief spring 473. One end of the pressure relief valve body 471 is securely installed in the pressure relief port 4515, and the other end extends out and is exposed on the outside of the outer cylinder body 4511. A pressure relief chamber 474 communicating with the pressure relief port 4514 is provided in the middle of the pressure relief valve body 471. A pressure relief hole 475 that communicates the pressure relief chamber 474 and the outside environment is provided on the side of the pressure relief valve body 471. The pressure relief valve core 472 is moveably disposed in the pressure relief chamber 474 by the pressure relief spring 473, and a limit blocking surface 4741 that cooperates with the pressure relief valve core 472 is formed on the inner side wall of the pressure relief chamber 474. In the closed state of the automatic pressure relief valve, the pressure relief valve core 472 is blocked at the junction of the pressure relief chamber 474 and the pressure relief port 4515 under the action of the pressure relief spring 473. At this time, the pressure relief valve core 472 is tightly attached to the limit blocking surface 4741, and the air in the air chamber 453 cannot be discharged. When the air pressure in the air chamber 453 gradually increases and exceeds the predetermined value, the air will enter the pressure relief chamber 474 through the pressure relief passage 4532 and the pressure relief port 4515 and gradually push the pressure relief valve core 472. When the pressure relief valve core 472 is pushed away from the limit blocking surface 4741 to form a gap, the air can pass through the gap and be discharged from the pressure relief hole 475, thereby relieving the pressure inside the air chamber 453. When the air pressure in the air chamber 453 drops to the predetermined value, under the action of the pressure relief spring 473, the pressure relief valve core 472 will be pushed back to its original position, making it closely attach to the limit blocking surface 4741. The automatic pressure relief valve does not need to be manually started when it is working, and it can automatically open according to the changes inside the air chamber 453, providing protection for the air chamber 453.

Figure 10:
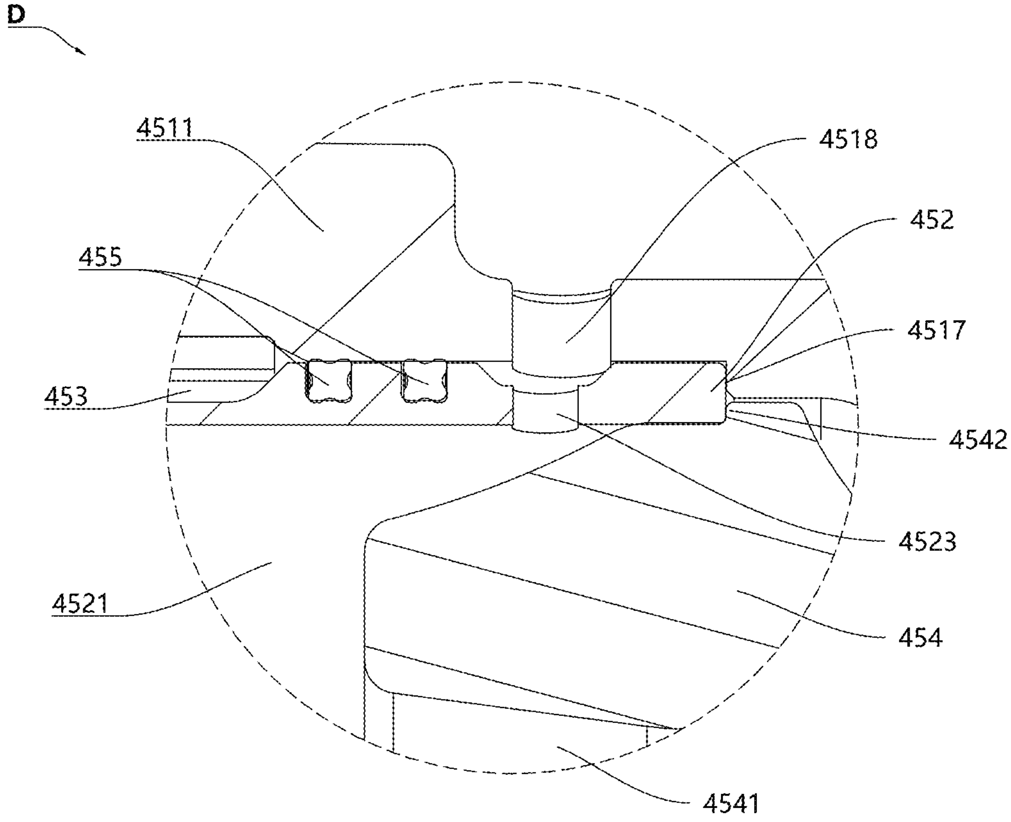
FIG. 10 is an enlarged view of part Din FIG. 4.

FIG. 10 shows a magnification view of section D of FIG. 4. As shown in FIG. 4, the front end of the inner cylinder 452 is fixedly connected with the front end of the outer cylinder 451, and a buffer pad 454 is provided at the connection point. A through hole 4541 is provided in the middle of the buffer pad 454 for the front end of the striking member 41 to extend out. The inner end face of the buffer pad 454 is used to cushion the piston part 412. The piston part 412 is pushed forward by the air pressure in the air cavity 453 (in the striking direction). The piston part 412 can move until it is stopped by the buffer pad 454. The buffer pad 454 can provide blockage and buffering for the piston part 412, preventing it from directly colliding with the inner side of the outer cylinder body 4511, thereby protecting the piston part 412.

As shown in FIGS. 9 and 10, in one embodiment, the specific installation structure of the buffer pad 454 is as follow. The cross section of the inner cylinder 452 has an annular sleeve structure, the outer periphery of the buffer pad 454 is formed with an installation protruding ring 4542, and the front end of the outer cylinder body 4511 forms a limiting surface 4516 and an installation snap ring 4517. The front end of the buffer pad 454 is pressed against the limiting surface 4516 (as shown in FIG. 4), and the front end of the inner cylinder 452 is pressed against the installation protruding ring 4542 and the installation snap ring 4517, thereby achieving the connection between the buffer pad 454, the inner cylinder 452, and the outer cylinder body 4511. As shown in FIG. 9, a third seal 455 is provided between the outer periphery of the inner cylinder 452 and the inner wall of the outer cylinder body 4511. In one embodiment, the third seal 455 is two sealing rings, and the front end of the outer cylinder body 4511 is provided with an outer through hole 4518 on the outer side of the inner through hole 4523. The inner through hole 4523 and the outer through hole 4518 are connected to each other, thus connecting the first chamber 4521 to the outside environment. In the cross-sectional view, the inner through hole 4523 and the outer through hole 4518 are located at the front of the third seal, the air chamber 453 is located at the back of the third seal, the third seal 455 not only enhances the tightness of the connection but also separates the air chamber 453 from the first chamber 4521, forming two independent spaces and avoiding the air chamber 453 from being connected to the outside environment and affected by the external air pressure.

Figure 11:
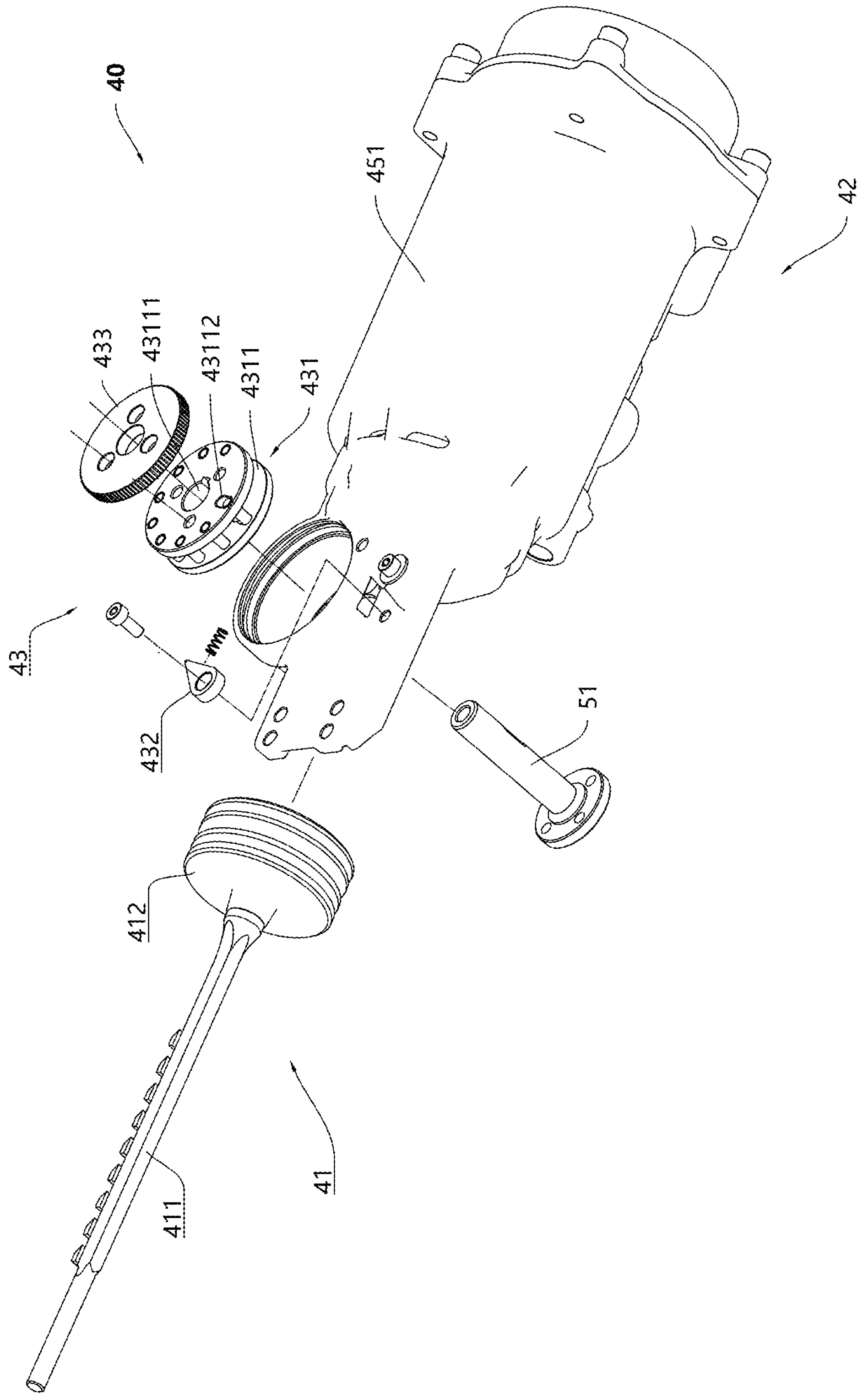
FIG. 11 is an exploded view of a part of the driving member according to one embodiment of the invention.

FIG. 11 is an exploded view of the driving member 43 of one embodiment of the invention. As shown in FIG. 11, the driving member 43 has a transmission component 431 and a limit component 432. The transmission component 431 is used to cooperate with the striking pin 411 and drive the striking pin 411 to move in the reverse direction along the striking direction. The limit component 432 is used to cooperate with the transmission component 431 to limit the movement of the striking pin 411. The transmission component 431 is provided with a limit disk 433 that cooperates with the limit component 432.

Figure 12:
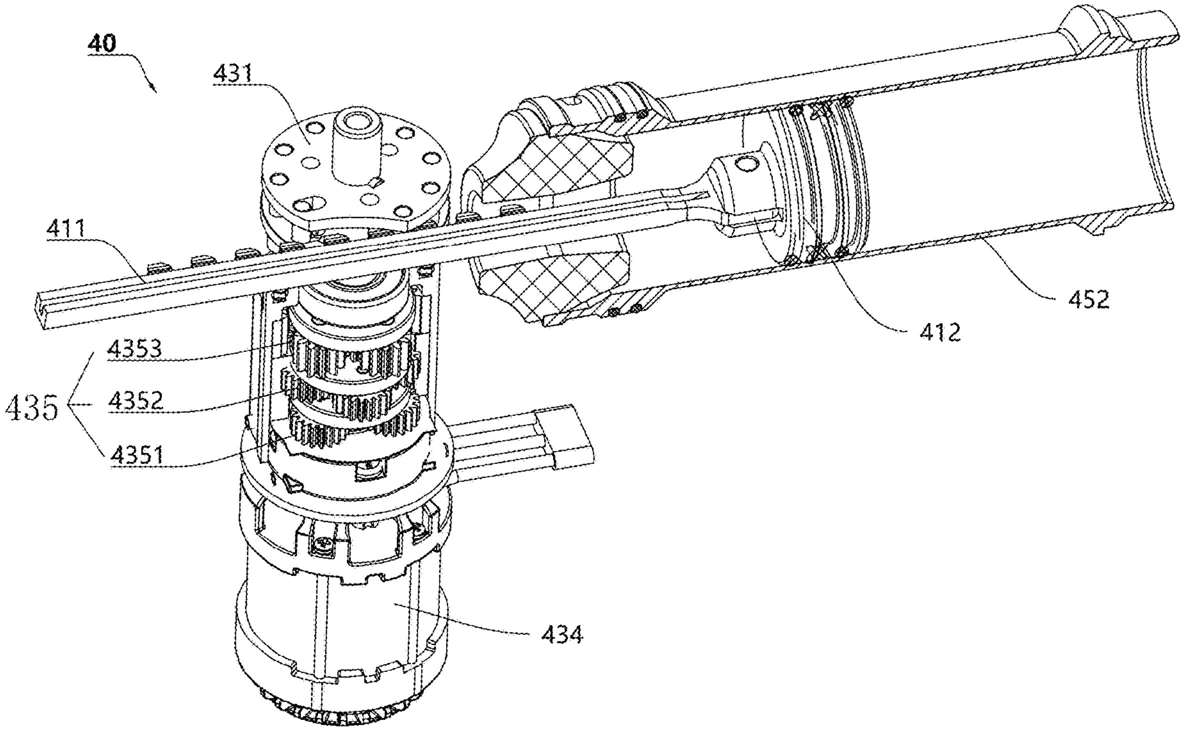
FIG. 12 is a cross-sectional view of the driving member matching the striking member according to one embodiment of the invention.

FIG. 12 is a cross-sectional schematic diagram of the driving member of one embodiment of the invention.

Figure 13:
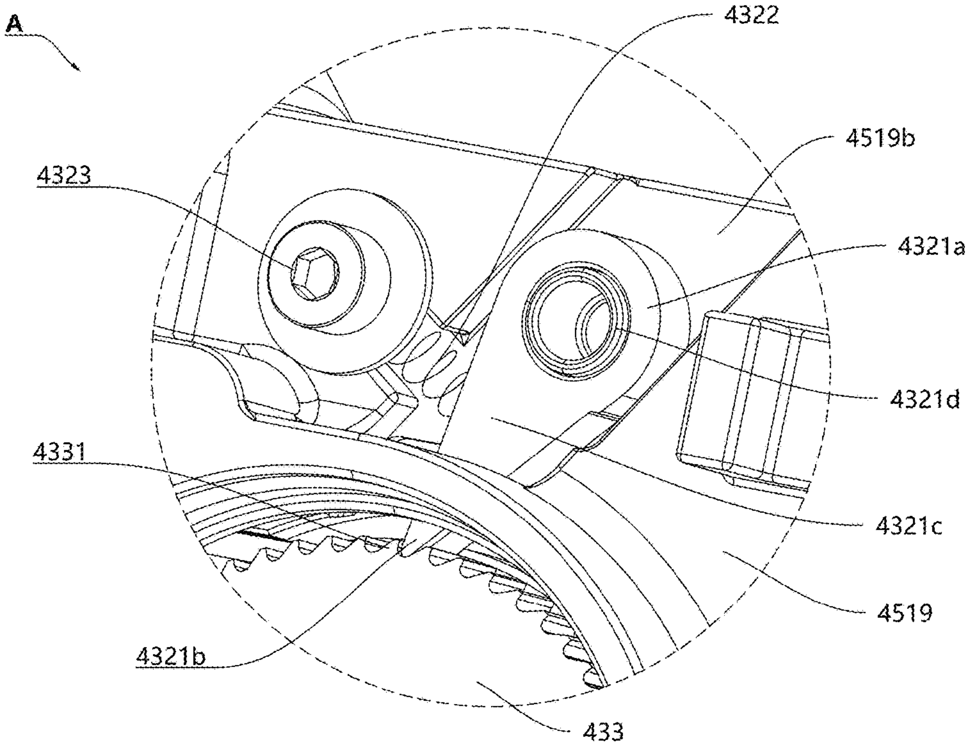
FIG. 13 is an enlarged view of part A in FIG. 3.

FIG. 13 is a magnification view of section A in FIG. 3.

As shown in FIG. 12, the driving member 43 also has a drive source for providing power to the transmission component 431 and a speed reducer. In one embodiment, the drive source is a motor 434 (powered by a lithium battery), a speed reducer 435 is installed on the output shaft of the motor 434. In one embodiment, the speed reducer 435 is a three-stage reducer, and has a first reducer 4351, a second reducer 4352, and a third reducer 4353 connected in series. In one embodiment, the transmission ratio of the entire reducer ranges between 1:2 to 1:120.

Figure 14:
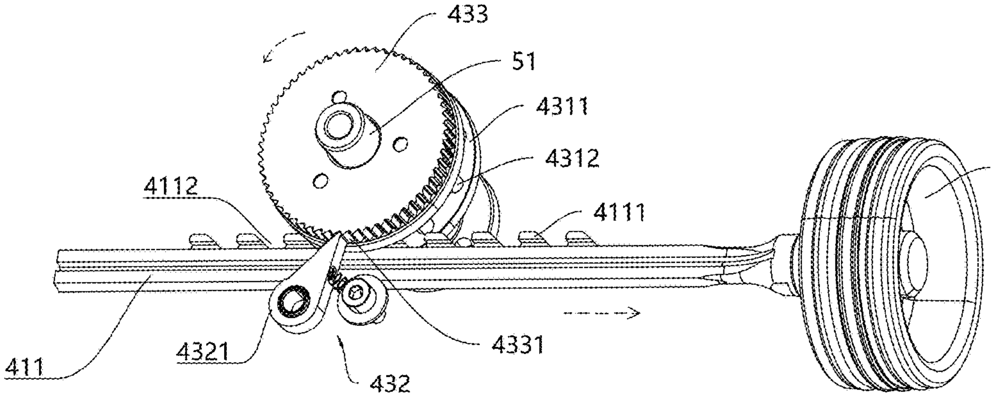
FIG. 14 is a schematic structural view of the structural cooperation between the driving member and the striking member according to one embodiment of the invention.

FIG. 14 is a schematic view of the cooperation structure of the driving member 43 and the striking member of one embodiment of the invention.

Figure 15:
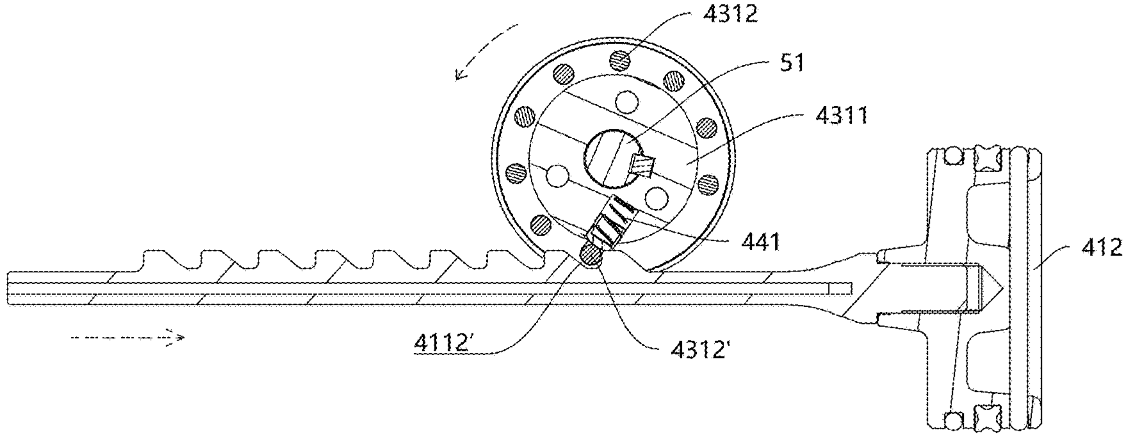
FIG. 15 is one of the cross-sectional views of the structural cooperation between the driving member and the striking member according to one embodiment of the invention.

FIG. 15 is one of the cross-sectional view of the cooperative structure of the driving member 43 and the striking member 41 in the embodiment of the invention.

Figure 16:
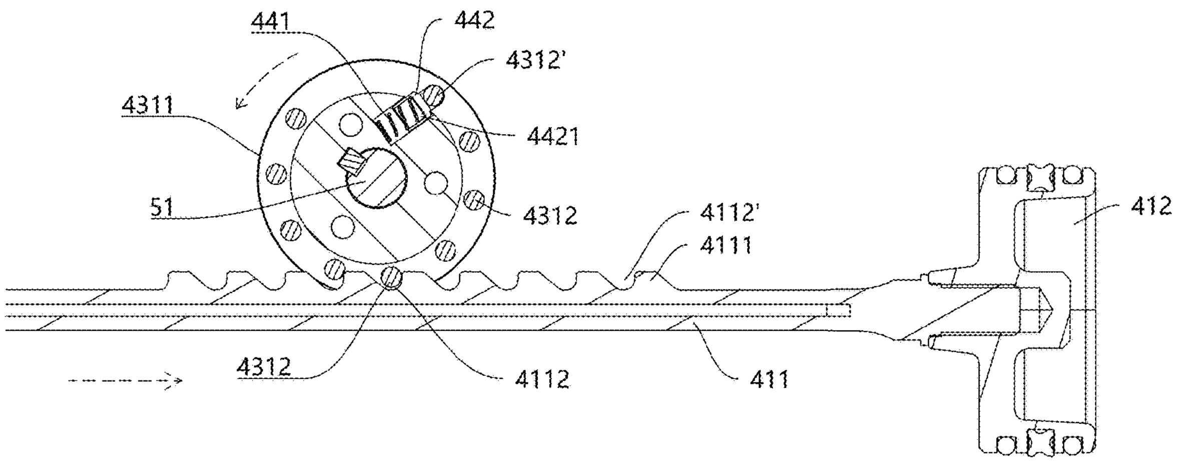
FIG. 16 is another cross-sectional view of the structural cooperation between the driving member and the striking member according to one embodiment of the invention.

FIG. 16 is another cross-sectional view of the cooperative structure of the driving member 43 and the striking member 41 of one embodiment of the invention.

As shown in FIGS. 14 and 15, one side of the striking pin 411 is equipped with several tooth blocks 4111, with tooth grooves 4112 formed between adjacent tooth blocks 4111. The transmission component 431 includes a rotating part 4311 and a matching part. The rotating part 4311 is a circular structure with a cross-section in the shape of a horizontal "H" character. A mounting hole 43111 is provided in the middle, through which the rotating part 4311 can be installed on the output shaft 51 of the nail gun's motor (not shown in the figure), allowing the rotating part 4311 to rotate under the drive of the motor. The matching part consists of several pinions 4312 arranged on the rotating part 4311, and these pinions 4312 are embedded in the tooth grooves 4112 of the striking pin 411 (as shown in FIG. 15), allowing the transmission component 431 to coordinate with the striking pin 411. When the rotating part 4311 rotates under the drive of the motor, the pinions 4312 are embedded in the tooth grooves 4112, thereby driving the striking pin 411 to move laterally. As shown in FIG. 14, when the pinions 4312 rotate counterclockwise with the rotating part 4311, they can drive the striking pin 411 to move to the right (using the arrow direction shown in FIG. 14 as a reference, the arrow direction of the striking pin is the opposite direction of the strike).

As shown in FIGS. 15 and 16, among the several pinions 4312, there is at least one movable pinion 4312'. A long oval hole 43112 is provided on the rotating part 4311 for the movable pinion 4312' to move (as shown in FIG. 11). A spring assembly is set between the movable pinion 4312' and the rotating part 4311. This spring assembly includes: a first spring 441, one end acts on the rotating part 4311, and the other end acts on the movable pinion 4312'. A cavity is opened in the rotating part 4311 for the installation of the first spring 441. The spring assembly also includes a top block 442 located between the first spring 441 and the movable pinion 4312'. The side of the top block 442 facing the first spring 441 is equipped with a limit hole 4421 for the first spring 441 to insert into, or a limit post for the first spring 441 to set on (in one embodiment, FIG. 16 shows a limit hole 4421); the end of the top block 442 facing the movable pinion 4312' has a working surface in contact with the movable pinion 4312'.

Each pinion 4312 corresponds to a tooth groove 4112, respectively. In one embodiment, there are 9 pinions 4312. The movable pinion 4312' is the first pinion used to embed in the first tooth groove 4112'. Making the first pinion movable can ensure that the first tooth groove 4112' is embedded better. For example, when triggered, if the movable pinion 4312' just touches the tooth block 4111, because the movable pinion 4312' is set to be movable, it will be pushed by the reaction force of the tooth block 4111 to make a slight movement within the oval hole 43112, and embed in the first tooth groove 4112' under the action of the first spring 441 (as shown in FIG. 15), enabling the first pinion and the first tooth groove to coordinate properly to avoid jamming. When each pinion 4312 continues to rotate counterclockwise following the rotating part 4311, each pinion gradually embeds into each corresponding tooth groove 4112, thereby gradually driving the striking pin 411 to move to the right (as shown in FIG. 16). Counterclockwise, the pinions from the first to the nth are evenly distributed at the edge of the rotating part 4311, and there is an equal distance of the first gap between every two adjacent pinions 4312. Clockwise, a second gap is formed between the first pinion and the nth pinion, and the second gap is larger than the first gap. When the rotating part 4311 runs to the second gap towards the striking pin 411, since no pinion is set between the second gap, the rotating part 4311 and the striking pin 411 are in a toothless state at this time, and the striking pin 411 under this state can be triggered by the energy storage member to move in the direction of the strike, thereby shooting the nail.

As shown in FIG. 14, the limiting disk 433 is a ratchet set coaxially with the rotating part 4311. The ratchet and the rotating part 4311 are both disposed on the output shaft 51 of the nail gun's motor and are connected and fixed together with the rotating part 4311 through a pin, and they rotate synchronously with the rotating part 4311 under the drive of the motor. The periphery of the ratchet is equipped with several ratchet teeth 4331. The limiting component 432 has ratchet claws 4321 that match the ratchet teeth 4331 and are used to embed between adjacent ratchet teeth. As shown in FIG. 14, the distance between adjacent ratchet teeth 4331 is smaller than the width of the tooth groove 4112, making the ratchet claw and ratchet teeth matching more secure and firm, not easy to come out. This embodiment adopts the above-mentioned method of the ratchet claw and ratchet teeth matching, which is much more secure and firm compared to the prior art of using the ratchet claw to directly match with the tooth groove 4112, because the distance between the ratchet teeth 4331 is far smaller than the width of the tooth groove 4112, the problem of ratchet teeth coming off, which occurs in existing technology, is less likely to happen. In practice, the limiting disk 433 can also be ratchet teeth disposed directly and integrally on the rotating part 4311. In one embodiment, the rotating part 4311 is made thicker by directly disposing the ratchet teeth on the periphery of the upper part of the rotating part 4311 (this implementation method is not shown in the figure). This method ensures that the limiting disk 433 rotates synchronously with the rotating part, while reducing the number of parts. But it has higher requirements for the processing technology of the rotating part.

Figure 17:
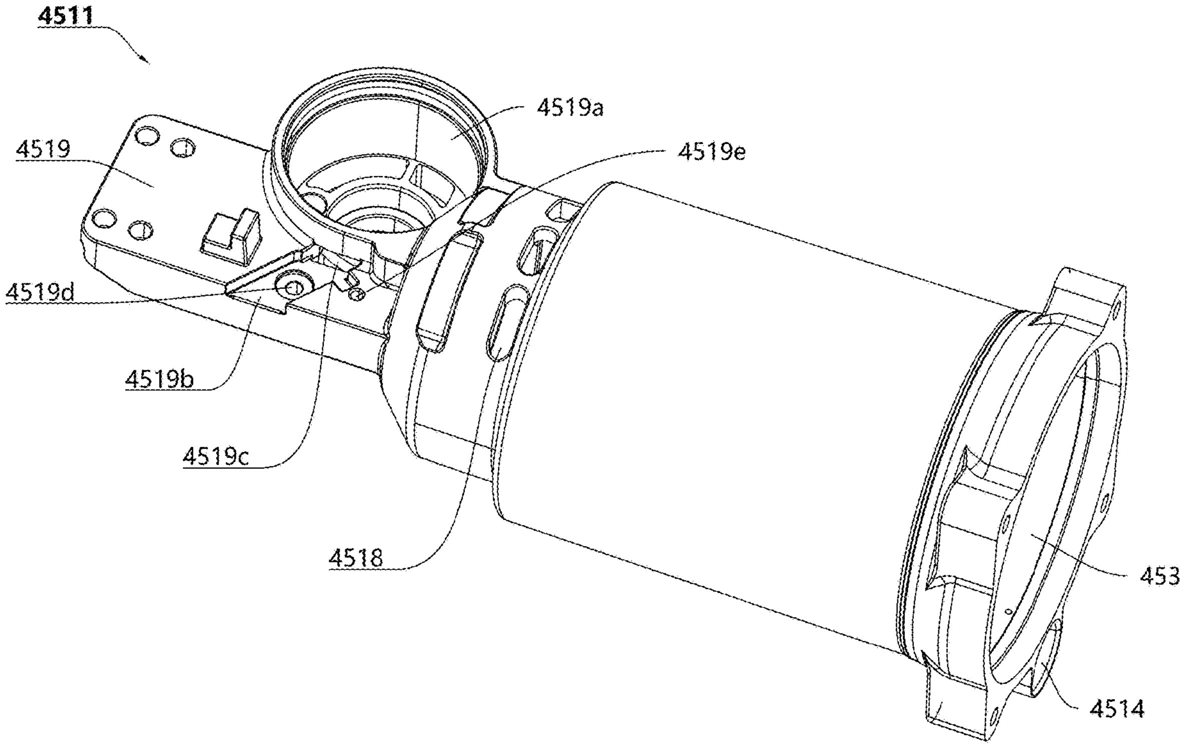
FIG. 17 is a schematic structural view of the outer cylinder body according to one embodiment of the invention.

FIG. 17 is a structural diagram of the outer cylinder body according to one embodiment of the invention.

Figure 18:
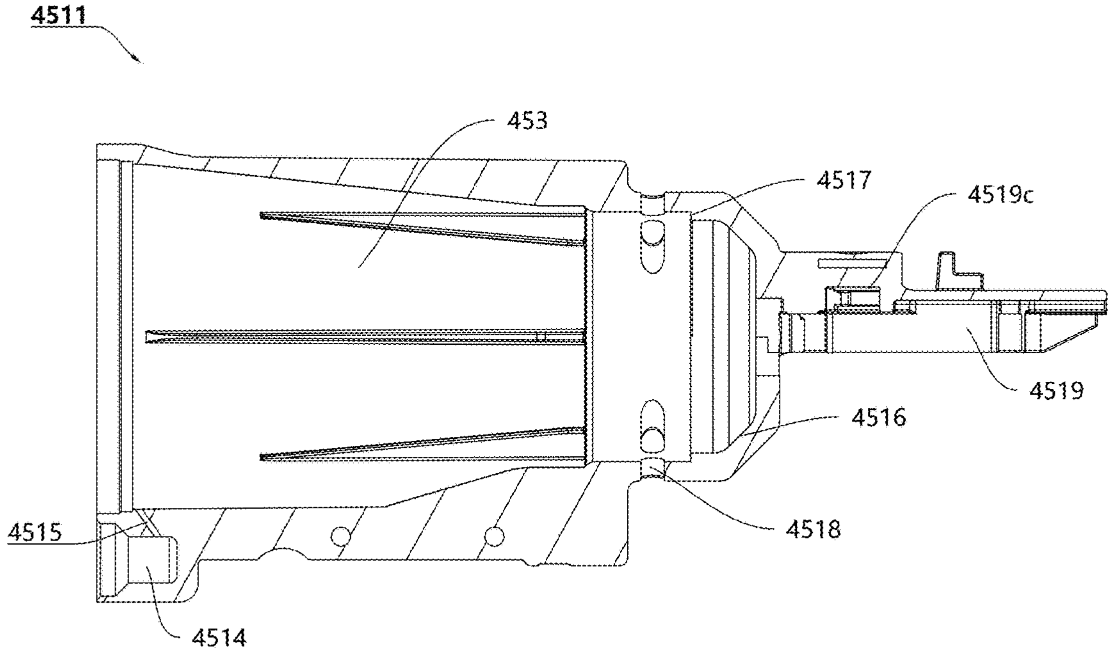
FIG. 18 is a cross-sectional view of the structure of the outer cylinder body according to one embodiment of the invention.

FIG. 18 is a cross-sectional view of the structure of the outer cylinder body according to one embodiment of the invention.

As shown in FIG. 17, a mounting portion 4519 is provided at the front end of the outer cylinder body 4511. The mounting portion 4519 is shaped with a recess **4519*a* for mounting driving members 43, and the recess 4519*a* has a shape that matches the rotating part of the driving member 43, namely, annular. A mounting groove 4519*b* is provided on one side of the mounting portion 4519 where the recess 4519*a* is located. The ratchet claw 4321 is mounted in the mounting groove 4519*b*, and a hole 4519*c* is provided on the side of the recess 4519*a* facing the mounting groove 4519*b* for one end of the ratchet claw 4321** to pass through.

As shown in FIG. 9, the ratchet claw 4321 has a positioning end **4321*a*, a limiting end 4321*b*, and a connecting section 4321*c*. The positioning end 4321*a* is rotatably mounted in the mounting groove 4519*b* through a rotating shaft 4321*d*. The limiting end 4321*b* extends into the recess 4519*a* through a hole 4519*c* on the side wall of the recess 4519*a* to engage with the ratchet tooth 4331 in the recess 4519*a*. The connecting section 4321*c* is the part connecting the positioning end 4321*a* and the limiting end 4321*b*. One side of the connecting section 4321*c* is provided with a second spring 4322. A positioning screw 4323 is inserted into the mounting part 4519 to provide support for one end of the second spring 4322. The two ends of the second spring 4322 are respectively abutted on the positioning screw 4323 and the connecting section 4321*c*. Under the action of the second spring 4322, the limiting end 4321*b* of the ratchet 4321 can better cooperate with the ratchet tooth 4331, so that the limiting end 4321*b* is embedded in the ratchet tooth 4331, avoiding the reverse rotation of the ratchet. Meanwhile, as shown in FIG. 17, positioning holes 4519*d* and 4519*e* are provided on the mounting portion 4519 corresponding to the rotating shaft 4321*d* and the positioning screw 4323**, respectively for mounting the rotating shaft 4321*d* and the positioning screw 4323. The cooperation between the ratchet tooth 4331 and the ratchet 4321 can prevent the ratchet from reversing. Because the ratchet is coaxially arranged with the rotating part, it can prevent the rotating part from reversing, thus preventing the firing pin component from misfiring and increasing safety.

Figure 19:
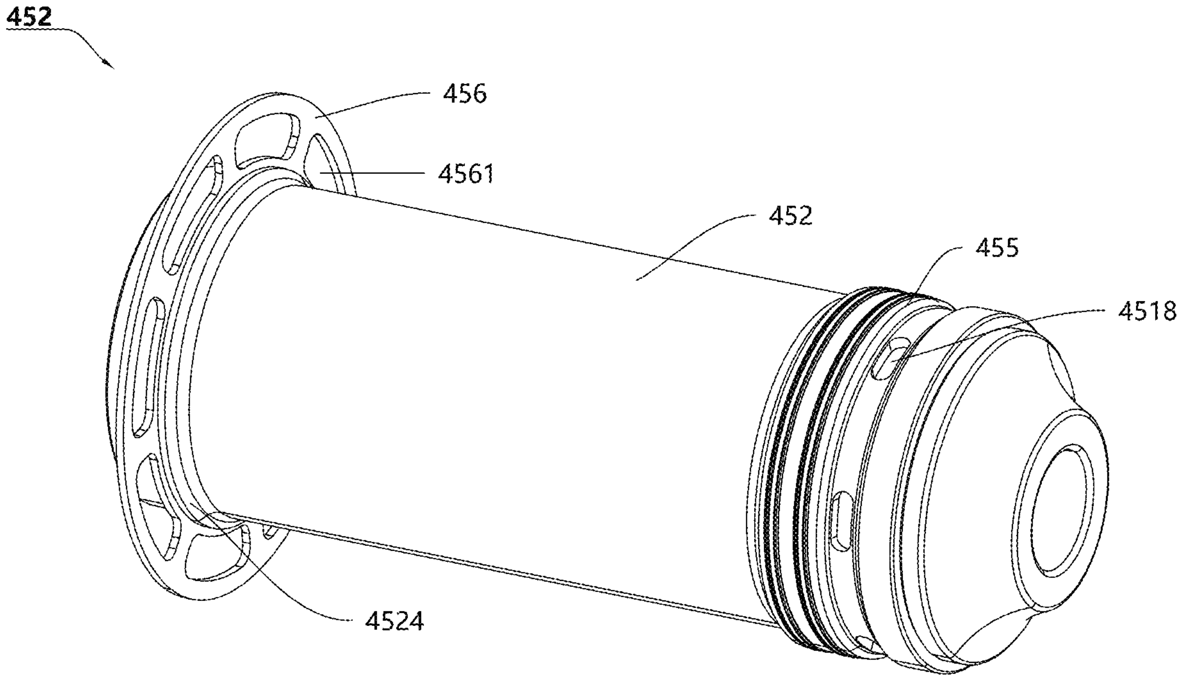
FIG. 19 is a schematic structural view of the inner cylinder body according to one embodiment of the invention.

FIG. 19 is a structural view of the inner cylinder according to one embodiment of the invention.

Figure 20:
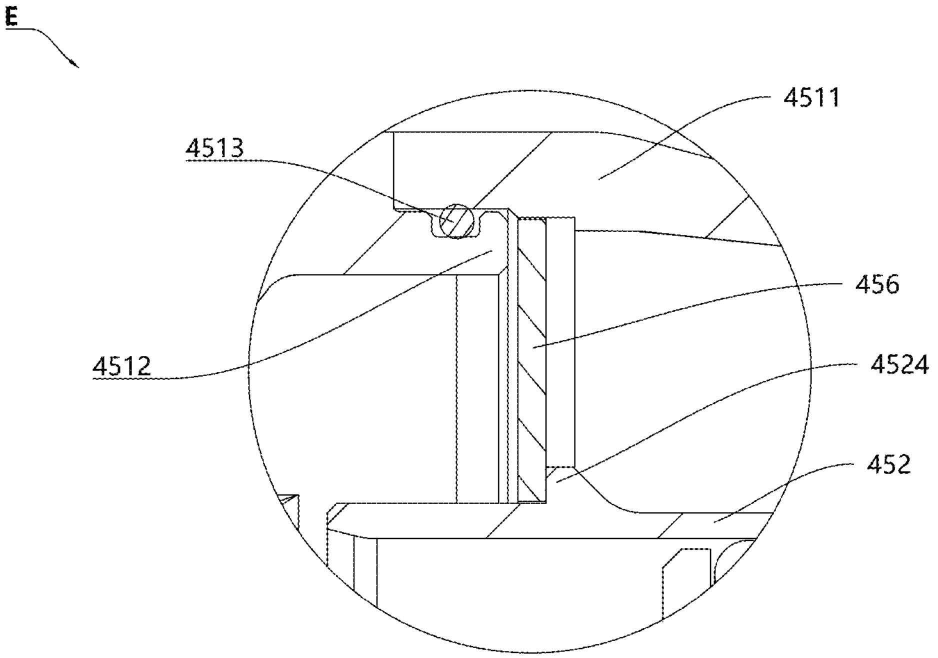
FIG. 20 is an enlarged view of part E in FIG. 4.

FIG. 20 is an enlarged view of part E of FIG. 4.

As shown in FIG. 4, the inner cylinder 452 is installed inside the outer cylinder body 4511, and the front end of the inner cylinder 452 is connected and locked to the inner wall of the outer cylinder body 4511 through the third seal 455. In order to allow the inner cylinder 452 to be more stably disposed inside the outer cylinder body 4511, as shown in FIG. 19, a protruding ring 4524 is provided at one end of the inner cylinder body 452 far from the third seal 455, and a positioning ring 456 is provided on one side of the protruding ring 4524. The positioning ring 456 has an air passage 4561. As shown in FIG. 20, the inner periphery of the positioning ring 456 is sleeved on the outer periphery of the inner cylinder body 452, and one side is abutted by the protruding ring 4524. The outer periphery of the positioning ring 456 is blocked by the end face of the rear cover body 4512 facing the outer cylinder body 4511, so that the positioning ring 456 can be limited between the rear cover body 4512 and the protruding ring 4524, enhancing the connection stability of the structure. The third seal 455 and the positioning ring 456 are respectively at the front and rear ends of the inner cylinder 452, supporting both ends of the inner cylinder 452, allowing the inner cylinder 452 to be more stably fixed inside the outer cylinder body 4511.

Working Principle of this Embodiment

The motor of the control device 50 in the nail gun starts, driving the transmission component 431 to rotate. During the rotation process, the rotating part 4311 gradually meshes with the tooth slot 4112 on the striking pin 411 from the first pinion (moving pinion 4312'), thereby driving the striking pin 411 and piston part 412 to move in the opposite direction of the striking direction inside the inner cylinder 452. As the piston part 412 moves, the volume of the second chamber 4522 gradually decreases, thereby compressing the air in the air chamber 453. The air pressure in the air chamber 453 gradually increases for energy storage. When the rotating part 4311 continues to rotate to form a gap with the striking pin 411, under the pressure of the air in the air chamber 45, the piston part 412 and striking pin 411 are pushed out in the striking direction, allowing the striking part 411 to nail the gun and complete the nailing work.

During the rotation process of the rotating part 4311, the ratchet (limiting disk 433) also rotates with the rotating part 4311. The ratchet claw 4321 meshes with the ratchet teeth 4331 on the ratchet periphery, which plays a role in preventing the ratchet from reversing, thereby avoiding the misfire of the striking pin 411 during the working process and enhancing safety.

Replacement method for the striking member in one embodiment: In the state where the nail gun is stopped, one should first remove the nail storage mechanism 30 and the casing 21, then disassemble the pressure relief component 47, so that the air chamber 453 can be depressurized, then disassemble the rear cover 4512 on the back side of the outer cylinder body 4511, take out the striking mechanism 41 located inside the inner cylinder 452, and replace the striking pin 411. At the same time, if the transmission component 431 also needs to be replaced, one should disassemble the transmission component 431 for replacement, put the striking mechanism 41 into the inner cylinder 452 before cover the rear cover 4512. Then one should connect the inflation device with the inflation component 46 to inflate the air chamber 453. After the inflation is completed, put back the casing 21, and install the corresponding nail storage mechanism 30 to continue the nailing work.

Effects of this Embodiment:

According to the nail gun of this embodiment, since the limit disk 433 that cooperates with the limit component 432 for restricting the movement of the striking pin 411 is directly disposed on the transmission part 431, there is no need to separately set a structure on the striking pin 411 that cooperates with the limit component 432, which simplifies the structure of the striking pin 411. Since there is no direct contact between the limit component 432 and the striking pin 411, there is no need to remove the limit relationship between the limit component 432 when the striking pin 411 is striked, i.e., there is no need to set a solenoid valve or other driving device at the limit component 432 to specifically drive the limit component 432 to rotate, simplifying the structure, reducing the cost, thus solving the defects brought about by the failure of the solenoid valve, making the entire nail gun more efficient, stable and safe during work.

Furthermore, when the striking member 41 is at a low energy storage position, the volume of the air chamber is V1, when the striking member is at a high energy storage position, the volume of the air chamber is V2, the difference in volume of the air chamber at high and low energy storage positions, V1-V2, is approximately or equal to V2/3. This difference is actually the volume of the region where the striking member 41 moves from a low energy storage position to a high energy storage position within the inner cylinder 452, which takes up a large proportion of the entire energy storage member. This is done by increasing the volume of the inner cylinder, which reduces the energy consumption of the entire gun body when it works, reducing the motor and battery consumption of the lithium battery nail gun. Therefore, it achieves the miniaturization and lightweighting of the lithium battery nail gun, and making it cheaper.

In one embodiment, the transmission component 431 includes a rotating part 4311 and a mating part. The rotating part is connected to the driving motor of the nail gun and driven by the driving motor to rotate. The mating part is several pinions 4312 distributed on the rotating part, which cooperate with the tooth grooves 4112 of the striking pin 411, so as to realize the cooperation between the transmission part 431 and the striking pin 411, and drive the striking part 411 to move. The engagement of pinion 4312 with tooth groove 4112 is more likely to mesh than the engagement of gear with rack, making the transmission more stable.

In one embodiment, the limiting disk 433 is a ratchet set coaxially with the rotating part, and several ratchet teeth 4331 are set on the outer periphery. The limiting component 432 is a ratchet claw 4321 that matches the ratchet teeth 4331, used to be embedded between adjacent ratchet teeth 4331. The ratchet/limiting disk 433 is set to be coaxial with the rotating part 4311, enabling synchronous rotation of the rotating part 4311 and the ratchet. The ratchet claw 4321 cooperates with the ratchet/limiting disk 433 to limit the reverse rotation of the rotating part 4311, thus achieving a restriction on the movement of the striker component 411, enhancing safety. Moreover, the ratchet and the rotating part 4311 are driven directly by the same drive motor, eliminating the need for additional power sources, simplifying the structure, reducing costs, lightening the weight, and making it convenient for carrying and using.

In one embodiment, the distance between the ratchet teeth 4331 on the ratchet is less than the width of the tooth groove 4112 on the striker pin 411. Compared to the ratchet claw 4321 directly matching with the tooth groove 4112, it has a more stable connection. The smaller the distance, the higher the tightness and accuracy of the ratchet claw 4321 match, greatly reducing or even eliminating the possibility of the ratchet claw 4321 skipping teeth, thereby reducing the probability of the striker pin 411 accidental shooting, and enhancing safety performance.

In one embodiment, the tooth pinion 4312 has at least one movable tooth pinion 4312'. When the transmission component 431 matches with the striker pin 411, the tooth pinion 4312 needs to be embedded in the tooth groove 4112 one by one. In actual use, it is easy for the tooth pinion 4312 and the tooth groove 4112 to not align completely, causing the tooth pinion 4312 to directly collide with the tooth block 4111 and be unable to properly engage and drive, and even get stuck. By setting the tooth pinion 4312 to be movable, when the movable tooth pin 4312' collides with the tooth block 4111, the movable tooth pin 4312' will make a slight movement under the impact force, thus accurately embedding into the tooth groove 4112, avoiding the transmission component 431 and the striker pin 411 getting stuck, thereby avoiding accidental shooting of the nail gun due to the two getting stuck and causing personal injury, further enhancing safety.

This embodiment's energy storage member includes two cylinder bodies, inner and outer cylinders. An air chamber is set between the inner and outer cylinder bodies. The inner cylinder 452 is disposed inside the outer cylinder 451. The inner cylinder 452 has a striking member 41 set up inside, and the striking member 41 is driven by the drive component 43 to cause changes in the air pressure in the air chamber, thus realizing nailing. The rear side of the outer cylinder body 4511 has a removable rear cover 4512, making it convenient to disassemble and maintain or replace the striking member 41 located inside the inner cylinder 452.

This embodiment's energy storage member 42 has a pressure relief component 47 leading to the air chamber 453. The pressure relief component 47 is an automatic relief valve. When the air pressure in the air chamber 453 increases and exceeds the predetermined safety value, the pressure relief component 47 will automatically open to relieve pressure in the air chamber 453, ensuring that the air pressure in the air chamber always remains within the safety value, ensuring the safety performance of the equipment. Meanwhile, the energy storage member 42 also has an inflation component 46 leading to the air chamber 453, which can inflate the inside of the air chamber 453 when necessary, which is very convenient.

This embodiment's energy storage member's outer cylinder 451 is directly integrally formed with a mounting portion 4519. The mounting portion 4519 is used to install a transmission component 431, which can drive the striking member to make a reverse linear motion along the striking direction. The mounting portion 4519 is made into a universal part, when it is necessary to use different nail guns, one only needs to replace the corresponding striker pin 411 (the striking member includes the striker pin and the piston component) and the transmission component 431, without having to replace the entire equipment, and thus having a wide range of applicability. When the user needs to carry out various types of construction, they don't need to carry various nail guns for different nails, instead, they just need to carry the suitable striker component and the transmission component, making it very convenient to carry. In addition, because this embodiment has pressure relief and inflation components, when the user needs to replace the nail, they can first remove the pressure relief component, let the air inside the air chamber discharge, then disassemble the rear cover, take out the piston and the nail, and finally replace and reinstall the nail. Afterward, the air chamber can be reinflated through the inflation component and the nail gun can be used again. If the casing is directly disassembled without first releasing the air inside the air chamber, it can easily cause accidental shooting of the nail, thus the pressure relief component can also serve as a safety component, enhancing the safety of the equipment.

In one embodiment, a positioning ring is disposed between the inner cylinder and the outer cylinder, forming two support points between the inner cylinder and the outer cylinder, one of which is the fixed point between the inner cylinder body and the outer cylinder body, and the other is where the positioning ring is located. These two support points provide a more stable support for the inner cylinder, preventing the inner cylinder from detaching from the outer cylinder and causing damage.

Embodiment 2

In one embodiment, the present invention provides a driving mechanism having a driving wheel, and a nail gun having the same to solve the problem of the last tooth pinion being easily worn out.

In one embodiment, the present invention provides a driving wheel in connection with the nail gun's drive motor. The driving wheel rotates under the drive of the motor, and mesh with and transmit power to the nail gun's striking member.

In one embodiment, the driving wheel includes a rotating part, driven by the drive motor for rotation. Several pinions are disposed on or in the rotating part for meshing and transmitting power with the striking member. Among the pinions, there is a releasable pinion that is slidably connected with the rotating part.

In one embodiment, the driving wheel has a spring member, positioned between the releasable pinion and the rotating part, with the rotating part having a movable hole for the movement of the releasable pinion.

In one embodiment, the driving wheel also has a spring chamber for installing a spring member. The spring member has a spring with one end placed in the spring chamber and the other end acts on the releasable pinion.

In one embodiment, the movable hole of the driving wheel is an arc-shaped slot.

In one embodiment, the spring member of the driving wheel also has a top block, located between the spring and the releasable pinion. The side of the top block facing the spring has a limit hole for the spring to insert or a limiting post for the spring to set over. The end of the top block facing the releasable pinion has a contact surface.

In one embodiment, the rotating part of the driving wheel also has a clearance notch.

In one embodiment, the driving wheel also has a first pinion among the several pinions, and the clearance notch is located between the releasable pinion and this first pinion.

In one embodiment, the driving wheel also has a second spring member, which includes a second spring. One end of the second spring acting on the rotating part and the other end acting on the first pinion. The rotating part has a second spring chamber to house the second spring, and a second movable hole locates on the rotating part for the movement of the first pinion.

In one embodiment, the driving wheel also has an extension direction of the second movable hole is parallel to the extension direction of the second spring chamber.

In one embodiment, the present invention also provides a driving mechanism of nail gun and includes at least a driving wheel and a striking member.

In one embodiment, the present invention includes a driving wheel which is equipped with a movable hole for the movement of the releasable pinion and a spring member. When the striking member is released, it avoids excessive friction between the striking member and the releasable pinion. This, in turn, prevents wear of the pinions, e.g. releasable pinion.

In one embodiment, the movable hole is an arc-shaped slot. When the tooth blocks of the striking member contact the releasable pinion, the tooth blocks of the striking member rest against the end of the movable hole. This ensures that the releasable pinion is in a stable stress state, preventing the premature release of the striking member.

In one embodiment, the top block slides telescopically within the spring chamber. After the striking member is striking, the extension of the spring resets the releasable pinion.

In one embodiment, the clearance notch reduces the material used in the rotating part, thereby reducing production costs. When the striking member is released for nailing, the clearance notch also provides sufficient clearance space for the striking member.

According to FIGS. 21 to 28, a driving wheel 5010 is connected to a motor of the nail gun. Under the drive of the motor, the driving wheel 5010 rotates, driving the striking member 411 to store energy.

Figure 21:
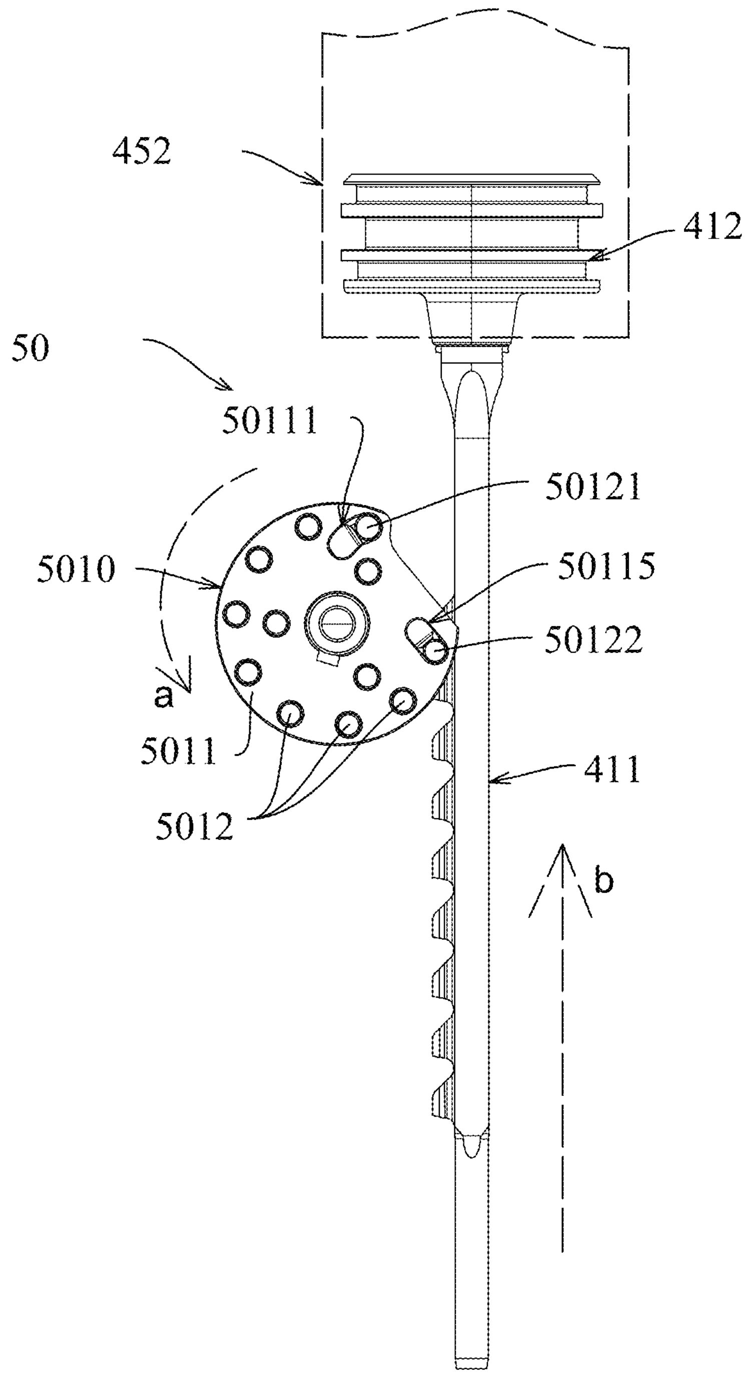
FIG. 21 is a schematic structural view of the driving mechanism in association with the striking mechanism according to one embodiment of the invention.
Figure 22:
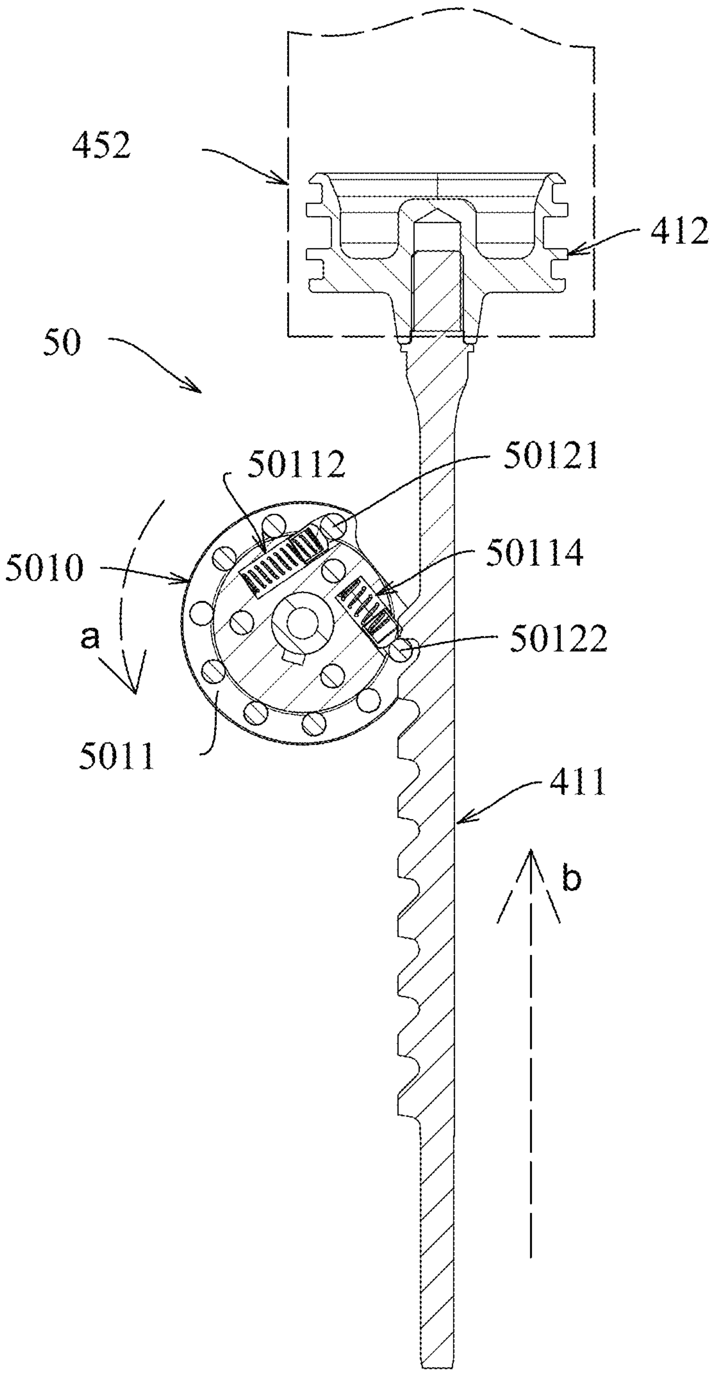
FIG. 22 is a cross-sectional view of FIG. 21 according to one embodiment of the invention.

Specifically, the driving wheel 5010 includes a rotating part 5011 and several pinions 5012. The rotating part 5011 connects to the drive motor and rotates under its drive. The pinions 5012 are arranged circumferentially on the rotating part 5011. These pinions 5012 include a releasable pinion 50121 and a first pinion 50122. The pinions between the releasable pinion 50121 and the first pinion 50122 are evenly distributed. The striking member 411 has more than one tooth blocks on its lateral side that mesh with the pinions 5012. When the drive motor operates, the first pinion 50122 contacts the tooth blocks on the striking member 411, as shown in FIG. 21-22. The striking member 411 starts to rise and store energy. As the rotating part 5011 continues to rotate, as shown by the arrow direction a in FIGS. 21-22, the striking member 411 continues to rise, as shown by the arrow direction b in FIGS. 21-22.

Figure 23:
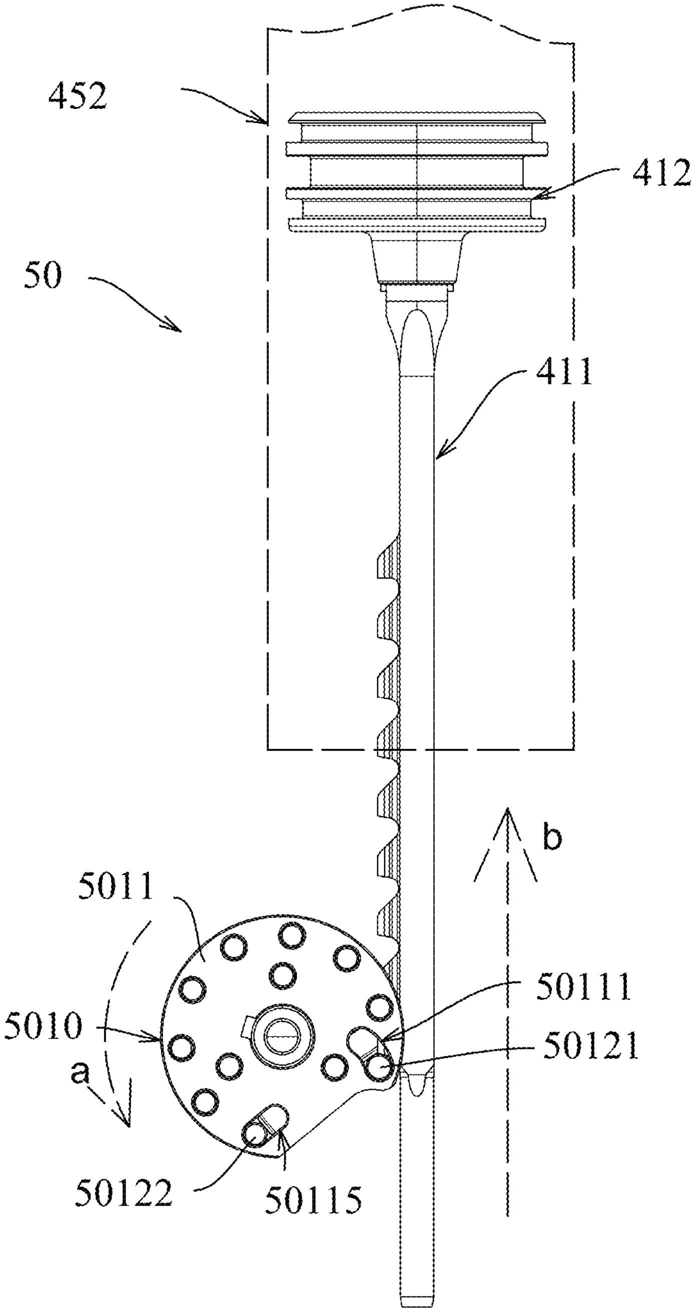
FIG. 23 is a schematic structural view of the driving mechanism in association with the striking mechanism according to another embodiment of the invention.
Figure 24:
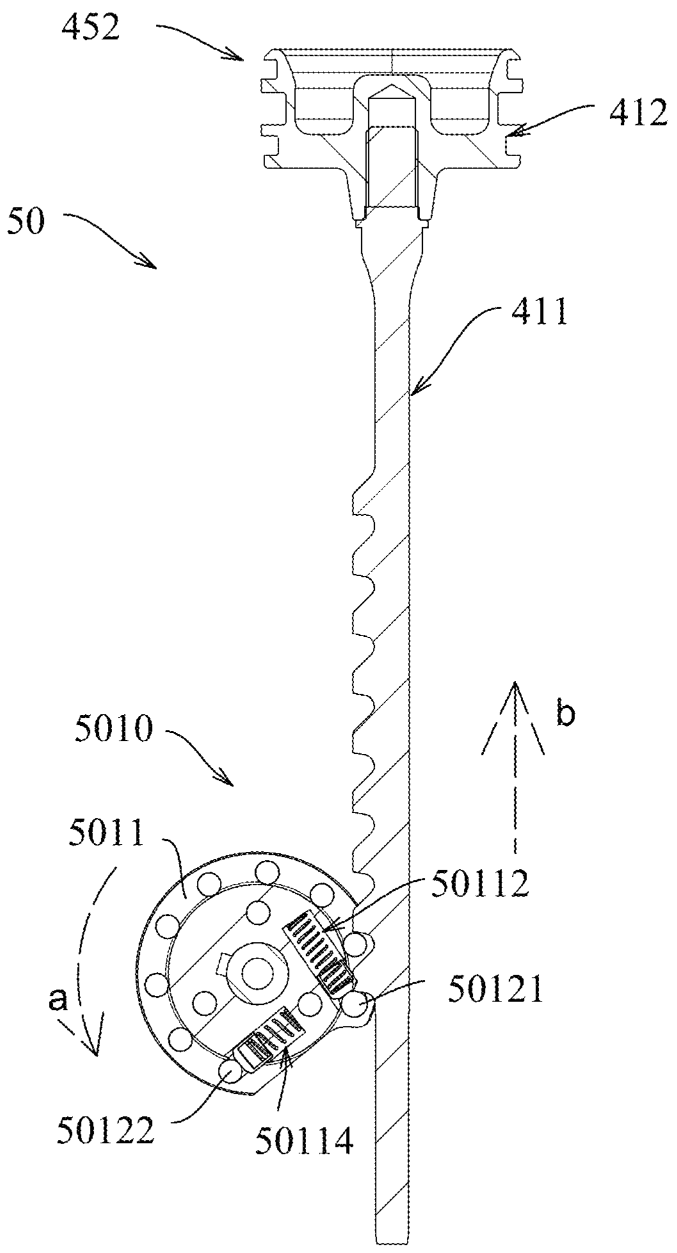
FIG. 24. is a cross-sectional view of FIG. 23 according to another embodiment of the invention.
Figure 25:
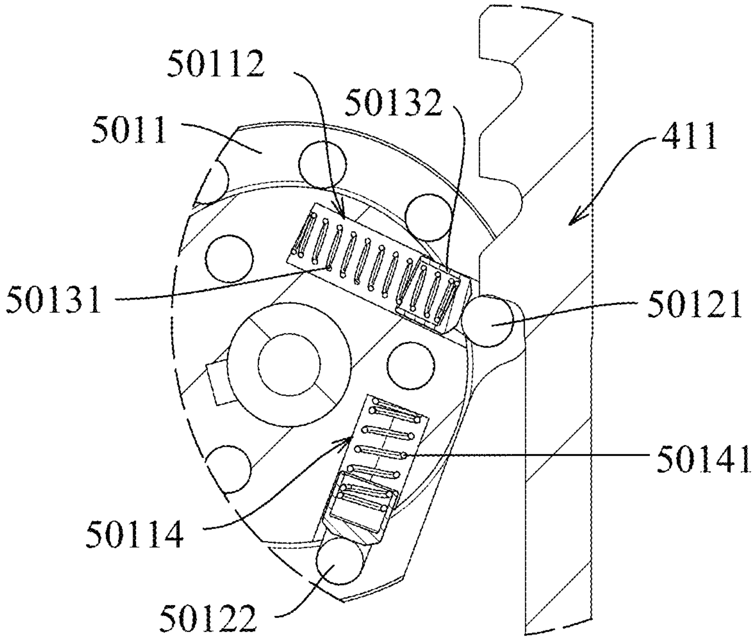
FIG. 25 is an enlarged cross-sectional view of the driving mechanism of FIG. 24 according to one embodiment of the invention.
Figure 26:
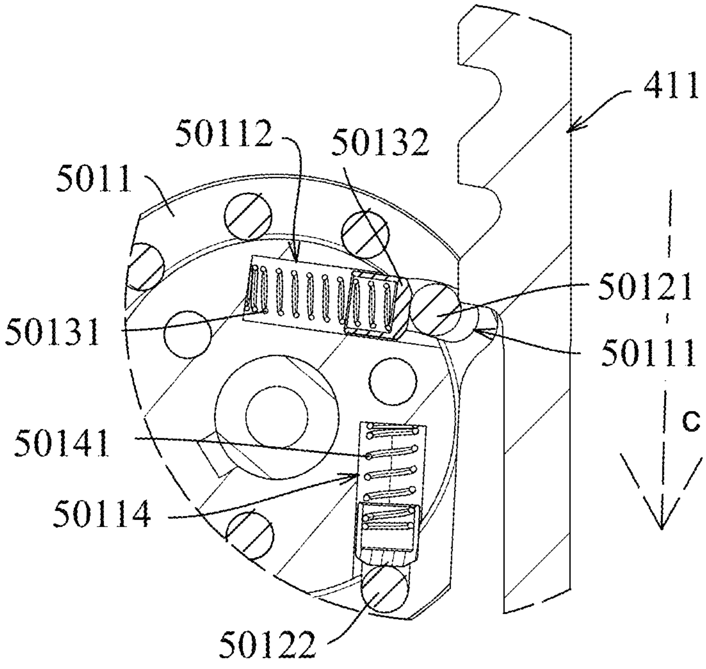
FIG. 26 is another enlarged cross-sectional view of the driving mechanism of FIG. 24 according to one embodiment of the invention.
Figure 27:
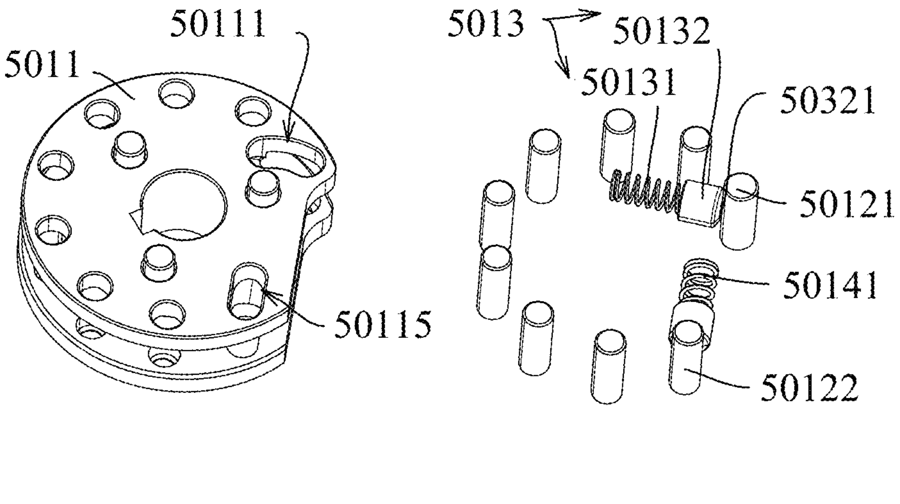
FIG. 27 is an exploded view of the drive wheel according to one embodiment of the invention.
Figure 28:
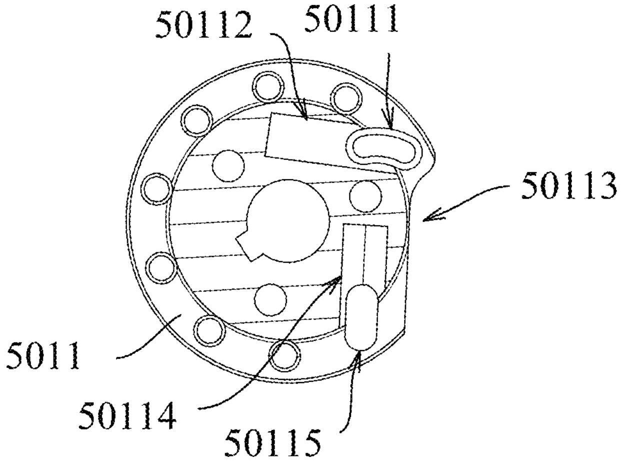
FIG. 28 is a cross-sectional view of the drive wheel in FIG. 27.

As the piston part 412 rises to store energy, it transitions from the state shown in FIG. 21 to that of FIG. 23, until the releasable pinion 50121 contacts the tooth block of the striking member 411, as shown in FIG. 24. As the rotating part 5011 continues to rotate, the striking member 411 disengages from the releasable pinion 50121, the stored energy is released, driving the striking member 411 to descend and shoot out, achieving nailing (the direction of the striking member extension is shown by arrow c in FIG. 26).

Furthermore, referring to FIGS. 25 to 28, the releasable pinion 50121 is slidably connected to the rotating part 5011, which has a movable hole 50111 for the releasable pinion 50121 to move therein. Between the releasable pinion 50121 and the rotating part 5011, there disposed a spring member 5013, which includes a spring 50131. One end of the spring 50131 acts on the rotating part 5011, and the other end acts on the releasable pinion 50121. The rotating part 5011 has a spring chamber 50112 for installing the spring member 5013. Specifically, referring to FIG. 27, the outer circumferential side of the rotating part 5011 has an inwardly concave annular groove. The groove has installation holes on both sides for installing the pinions 5012. One side of the groove has a through hole, while the other side has a countersunk hole. The pinions 5012 pass through the through hole and then insert into the countersunk hole, achieving the connection between the pinions 5012 and the rotating part 5011. The movable hole 50111 is divided into two parts: one is an elongated through hole, and the other is an elongated countersunk hole, located on both sides of the groove. The releasable pinion 50121 passes through the elongated through hole and then inserts into the elongated countersunk hole, and it can move within the movable hole. The spring 50131 is installed inside the spring chamber 50112, with one end acts against the interior of the spring chamber 50112 and the other end acts against the releasable pinion 50121. When the pressure from the tooth blocks of the striking member 411 against the releasable pinion 50121 exceeds a certain level, the releasable pinion 50121 can retract, releasing the striking member 411. This instantaneous release of the striking member avoids excessive friction between the striking member and the release position pin, thereby preventing wear of the tooth blocks and wear of the releasable pinion.

Furthermore, the movable hole 50111 is an arc-shaped elongated hole, and the center of this arc-shaped elongated hole is located on the side close to the first pinion. The advantage of this arc-shaped elongated design is that, when the releasable pinion 50121 contacts the tooth block of the striking member 411, the tooth block of the striking member 411 abuts against the end of the movable hole 50111 with the releasable pinion 50121, making the releasable pinion 50121 in a stable force-receiving state (referring to the state in FIG. 25), preventing the striking member 411 from being released prematurely. As the rotating part 5011 continues to rotate, the striking member 411 continues to rise, and the stored energy at the piston part 412 continues to increase, causing greater contact pressure between the tooth block of the striking member 411 and the releasable pinion 50121, until the state in FIG. 26, where the releasable pinion 50121 retracts and compresses spring member 5013, and the striking member 411 is released to nail.

Furthermore, the spring member 5013 also includes a top block 50132, located between the spring 50131 and the releasable pinion 50121. One side of the top block 132 facing the spring 50131 is equipped with a limiting hole for inserting the spring or a limiting column for fitting the spring; another side of the top block 50132 facing the releasable pinion 50121 is equipped with a contact surface 50321 that contacts the releasable pinion 50121. This top block 50132 can slide telescopically within the accommodating spring chamber 50112, and after the striking member 411 is released to nail, the elongation of the spring 50131 resets the releasable pinion 50121.

On the rotating part 5011, there is a clearance notch 50113, which is located between the releasable pinion 50121 and the first pinion 50122. The design of this clearance notch 50113 reduces the material used in the rotating part 5011, thus reducing production costs. When the striking member 411 is released to nail, this clearance notch 50113 also provides sufficient space for the striking member 411 to pass through.

Furthermore, the driving wheel 5010 also includes a second spring member 5014. This second spring member 5014 includes a second spring 50141 with one end acting on the rotating part 5011 and the other end acting on the first pinion 50122. There is a second spring chamber 50114 in the rotating part 5011 for installing the second spring member 50141, and there is a second movable hole 50115 on the rotating part 5011 for the first pinion 50122 to move. After the striking member 411 nails, the first pinion 50122 should mesh again with the striking member 411 for the striking member 411 to store energy again. However, at such a time, it cannot guarantee that the striking member 411 is in the predetermined meshing position. Thus, when the striking member 411 is not in the predetermined meshing position, first pinion 50122 would collide and create intense friction with the striking member 411. Therefore, the movable feature of the first pinion 50122 and the design of the second spring member 5014 allow the first pinion 50122 to avoid the collision and intense friction, thus preventing the wear on the striking member 411 and the first pinion 50122 due to this friction. During the rotation of the driving wheel 5010, the second spring member 50141 extends to make the first pinion 50122 fully mesh with the tooth blocks on the striking member 411.

Furthermore, the extension direction of the second movable hole 50115 is parallel to the extension direction of the second spring chamber 50114.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. An energy storage and driving mechanism used for a nail gun, comprising:

a striking member for striking a nail stored inside the nail gun in a striking direction;

a driving member driving the striking member to move in a direction opposite to the striking direction; and an energy storage member providing energy to the striking member and storing energy when the striking member is driven by the driving member;

wherein the energy storage member comprises a storage component comprising an inner cylinder, an outer cylinder interconnected to the inner cylinder, and an air chamber formed between the inner cylinder and the outer cylinder;

wherein the striking member is partially and movably disposed inside the inner cylinder;

wherein the striking member is movable between a low-energy storage position and a high-energy storage position;

wherein the driving member comprises a power source; a speed reducer connected to the power source; and a transmission component connected to the speed reducer and the striking member to drive the striking member; and wherein the speed reducer comprises a first reducer and a second reducer, and the speed reducer has a transmission ratio about 1:120.

2. The energy storage and driving mechanism of claim 1, wherein when the striking member is at the low-energy storage position, the air chamber has a volume of V1;

wherein when the striking member is at the high-energy storage position, the air chamber has a volume of V2; and wherein V1-V2 is approximately or equal to V2/3.

3. The energy storage and driving mechanism of claim 2, wherein the V1 is about 920 ml, and the V2 is about 690 ml.

4. The energy storage and driving mechanism of claim 1, wherein the transmission component comprises a limiting disk for being driven by the speed reducer to rotate; and a rotating part in connection with the limiting disk, wherein the rotating part comprises more than one pinions respectively received by more than one grooves formed on the striking member.

5. The energy storage and driving mechanism of claim 1, wherein the outer cylinder comprises an outer cylinder body; and a back cover detachably disposed at a rear end of the outer cylinder body; and a first seal disposed between the back cover and the outer cylinder body.

6. The energy storage and driving mechanism of claim 5, wherein the outer cylinder body comprises an inlet; an inlet passage connecting the inlet to the air chamber; and an inflation component in connection with the inlet.

7. The energy storage and driving mechanism of claim 6, wherein the outer cylinder body further comprises a pressure relief port on a front end of the outer cylinder body; a pressure relief component connected to the pressure relief port; and a pressure relief passage connected to the pressure relief port and the air chamber.

8. The energy storage and driving mechanism of claim 7, wherein the inflation component is configured to inflate the air chamber; and the pressure relief component is configured to release pressure in the air chamber.

9. The energy storage and driving mechanism of claim 8, wherein the pressure relief component comprises an automatic pressure relief valve which is configured to open automatically when the pressure of the air chamber exceeds a predetermined pressure.

10. The energy storage and driving mechanism of claim 1 further comprising a buffer pad disposed at an inner side of a front end of the inner cylinder and is configured for buffering the striking member.

11. The energy storage and driving mechanism of claim 10, wherein the buffer pad comprises a through hole which is configured to permit a front end of the striking member to pass through; and an installation protruding ring which is configured to abut against a surface of the front end of the inner cylinder.

12. The energy storage and driving mechanism of claim 11, wherein the inner cylinder comprises a first chamber and a second chamber; volume of each of the first and the second chamber is variable, and wherein the first chamber fluidly communicates with the outside, the second chamber fluidly communicates with the air chamber; and wherein the front end of the inner cylinder comprises an inner through hole connecting the first chamber to the outside.

13. An energy storage and driving mechanism used for a nail gun, comprising:

a striking member for striking a nail stored inside the nail gun in a striking direction;

a driving member driving the striking member to move in a direction opposite to the striking direction; and an energy storage member providing energy to the striking member and storing energy when the striking member is driven by the driving member;

wherein the energy storage member comprises a storage component comprising an inner cylinder, an outer cylinder interconnected to the inner cylinder, and an air chamber formed between the inner cylinder and the outer cylinder;

wherein the striking member is partially and movably disposed inside the inner cylinder;

wherein the striking member is movable between a low-energy storage position and a high-energy storage position;

wherein the outer cylinder comprises an outer cylinder body; and a back cover detachably disposed at a rear end of the outer cylinder body; and a first seal disposed between the back cover and the outer cylinder body;

wherein the outer cylinder body comprises an inlet; an inlet passage connecting the inlet to the air chamber; an inflation component in connection with the inlet; a pressure relief port on a front end of the outer cylinder body; a pressure relief component connected to the pressure relief port; and a pressure relief passage connected to the pressure relief port and the air chamber;

wherein the inflation component is configured to inflate the air chamber; and the pressure relief component is configured to release pressure in the air chamber;

wherein the pressure relief component comprises an automatic pressure relief valve which is configured to open automatically when the pressure of the air chamber exceeds a predetermined pressure; and wherein the automatic pressure relief valve comprises a pressure relief valve body having a pressure relief chamber and a pressure relief hole; a pressure relief valve core movably disposed in the pressure relief chamber; and a pressure relief spring disposed inside the pressure relief chamber and providing a force to the pressure relief valve core.

14. An energy storage and driving mechanism used for a nail gun, comprising:

a striking member for striking a nail stored inside the nail gun in a striking direction;

a driving member driving the striking member to move in a direction opposite to the striking direction; and an energy storage member providing energy to the striking member and storing energy when the striking member is driven by the driving member;

wherein the energy storage member comprises a storage component comprising an inner cylinder, an outer cylinder interconnected to the inner cylinder, and an air chamber formed between the inner cylinder and the outer cylinder;

wherein the striking member is partially and movably disposed inside the inner cylinder;

wherein the striking member is movable between a low-energy storage position and a high-energy storage position;

wherein a buffer pad is disposed at an inner side of a front end of the inner cylinder and is configured for buffering the striking member;

wherein the buffer pad comprises a through hole which is configured to permit a front end of the striking member to pass through; and an installation protruding ring which is configured to abut against a surface of the front end of the inner cylinder;

wherein the inner cylinder comprises a first chamber and a second chamber; volume of each of the first and the second chamber is variable, and wherein the first chamber fluidly communicates with the outside, the second chamber fluidly communicates with the air chamber; and wherein the front end of the inner cylinder comprises an inner through hole connecting the first chamber to the outside; and wherein the outer cylinder comprises an installation snap ring disposed on an inner wall of the outer cylinder for abutting against the front end of the inner cylinder; an outer through hole connected to the inner through hole; and a limit surface for limiting the movement of the buffer pad.

15. The energy storage and driving mechanism of claim 14, wherein the inner cylinder comprises a third seal on its outer periphery, forming a sealed state between the inner cylinder and the outer cylinder; wherein the outer through hole and the air chamber are respectively located on two sides of the third seal.

16. An energy storage and driving mechanism used for a nail gun, comprising:

a striking member for striking a nail stored inside the nail gun in a striking direction;

a driving member driving the striking member to move in a direction opposite to the striking direction; and an energy storage member providing energy to the striking member and storing energy when the striking member is driven by the driving member;

wherein the energy storage member comprises a storage component comprising an inner cylinder, an outer cylinder interconnected to the inner cylinder, and an air chamber formed between the inner cylinder and the outer cylinder;

wherein the striking member is partially and movably disposed inside the inner cylinder;

wherein the striking member is movable between a low-energy storage position and a high-energy storage position;

wherein a positioning ring is disposed between the inner cylinder and the outer cylinder for supporting the inner cylinder; wherein the positioning ring comprises an air passage for air to pass through; wherein the front end of the inner cylinder is connected to the outer cylinder, the rear end of the inner cylinder is connected to the outer cylinder through the positioning ring; and wherein a convex ring matching the positioning ring is disposed on an outer circumference of the inner cylinder, and the positioning ring is limited between the back cover and the convex ring.

17. A nail gun for nailing, comprising:

an energy storage and driving mechanism of claim 16 for striking nails to move along a striking direction;

a nail pass-through mechanism allowing the nails to pass through; and a power source providing energy for the energy storage and driving mechanism, wherein the power source is a battery.

* * * * *